US010997000B1

(12) United States Patent
Meyers

(10) Patent No.: US 10,997,000 B1
(45) Date of Patent: May 4, 2021

(54) EVENT PUBLISHING SYSTEM FOR HETEROGENEOUS EVENTS

(71) Applicant: Amazon Technologies, Inc., Seattle, WA (US)

(72) Inventor: Ian Meyers, East Molesey (GB)

(73) Assignee: Amazon Technologies, Inc., Seattle, WA (US)

( * ) Notice: Subject to any disclaimer, the term of this patent is extended or adjusted under 35 U.S.C. 154(b) by 145 days.

(21) Appl. No.: 16/195,473

(22) Filed: Nov. 19, 2018

(51) Int. Cl.
*G06F 9/54* (2006.01)
*G06F 16/27* (2019.01)

(52) U.S. Cl.
CPC .............. *G06F 9/542* (2013.01); *G06F 16/27* (2019.01)

(58) Field of Classification Search
CPC .................................. G06F 9/542; G06F 16/27
See application file for complete search history.

(56) References Cited

U.S. PATENT DOCUMENTS

| 7,434,046 | B1 | 10/2008 | Srivastava |
| 2004/0028069 | A1 | 2/2004 | Tindal et al. |
| 2007/0101424 | A1 | 5/2007 | Ravi et al. |
| 2008/0046627 | A1 | 2/2008 | Castro et al. |
| 2016/0210341 | A1* | 7/2016 | Zhuang .................... G06F 16/27 |
| 2018/0083977 | A1* | 3/2018 | Murugesan ............. G06F 16/27 |
| 2019/0089809 | A1* | 3/2019 | Theebaprakasam ......... G06F 11/3082 |
| 2019/0171650 | A1* | 6/2019 | Botev .................... G06F 16/256 |
| 2019/0306010 | A1* | 10/2019 | Medam .................... G06F 9/542 |
| 2019/0306237 | A1* | 10/2019 | Srinivasan ............. G06F 16/27 |
| 2019/0312857 | A1* | 10/2019 | Lander .................. G06F 3/0607 |

* cited by examiner

*Primary Examiner* — Doon Y Chow
*Assistant Examiner* — Kimberly L Jordan
(74) *Attorney, Agent, or Firm* — Robert C. Kowert; Kowert, Hood, Munyon, Rankin & Goetzel, P.C.

(57) ABSTRACT

Systems and methods are disclosed to implement a multi-region event publishing system to broadcast heterogeneous events across regions. In embodiments, an event publisher at a first location receives an event to be published and writes the event to a first data store of a multi-location replicated data storage system. The event publisher may generate metadata for the event including a source location, destination location(s), and a timestamp. The event is replicated to a second data store of the multi-location replicated data storage system at a second location. The second data store generates a change stream to an event receiver. The event receiver filters the second change stream based on the event metadata, and provides the filtered events to registered event consumers.

20 Claims, 12 Drawing Sheets

| | | | | | | | event table 300 |
|---|---|---|---|---|---|---|---|
| Event Name 310 | Seq. No. 312 | Source 314 | Destination 316 | Timestamp 318 | Time To Live 320 | Client Metadata 322 | Event Data 324 |
| Status AAA | 24 | US-East | All | 13:05:05 | NONE | generator=A; listener=log; level=0 | |
| Status BBB | 25 | US-East | US-West-1 US-West-2 | 13:07:54 | 6 hours | listener=X,Y,Z | <encrypted> |
| Reboot X | 26 | US-West-1 | US-West-1 US-West-2 | 13:33:22 | 2 hours | type=sys | |
| Config Change | 27 | US-East | All | 13:45:45 | 1 day | type=admin; chunk=1 | <encrypted> |
| Config Change | 28 | US-East | All | 13:45:45 | 1 day | type=admin; chunk=2 | <encrypted> |
| Config Change | 29 | US-East | All | 13:45:45 | 1 day | type=admin; chunk=3 | <encrypted> |
| Config Change | 30 | US-East | All | 13:45:45 | 1 day | type=admin; chunk=4 | <encrypted> | globally unique event ID 305

EVENT PUBLISHING SYSTEM FOR HETEROGENEOUS EVENTS

BACKGROUND

Commoditization of computer hardware and software components has led to the rise of service providers that provide computation and storage capacity as a service. High throughput and availability demands have driven these services become more distributed on a geographical scale. Different approaches to the replication of data distributed geographically have resulted in significant challenges in complexity, availability, and performance.

In some applications, geographically distributed systems may require events generated in one region to be shared among a number of other regions. For example, configuration change events generated in a master region may need to be provided to and appropriately handled at other regions in the system. In some cases, events may need to be cached locally at a region to facilitate delayed actions by local event handlers. However, conventional event delivery systems are generally implemented for their ad hoc purposes, making such systems unusable outside of their particular application context. Conventional event delivery systems do not provide sufficient flexibility to handle different event types generated by and for a variety of different applications. This problem is particularly significant in application hosting services, where the service provider network does not have prior knowledge of the types of events that may be generated by their customers' applications. In many cases, customer applications must provide their own event delivery systems, which are costly to build and often inefficient and error-prone in execution. There is a general need in the field for an efficient, robust, and universally usable event distribution system for forwarding heterogeneous events in among different types of distributed applications.

BRIEF DESCRIPTION OF THE DRAWINGS

FIG. 3 illustrates an example event table that may be used to implement an event publishing system for heterogeneous events, according to some embodiments.

Figure 1:
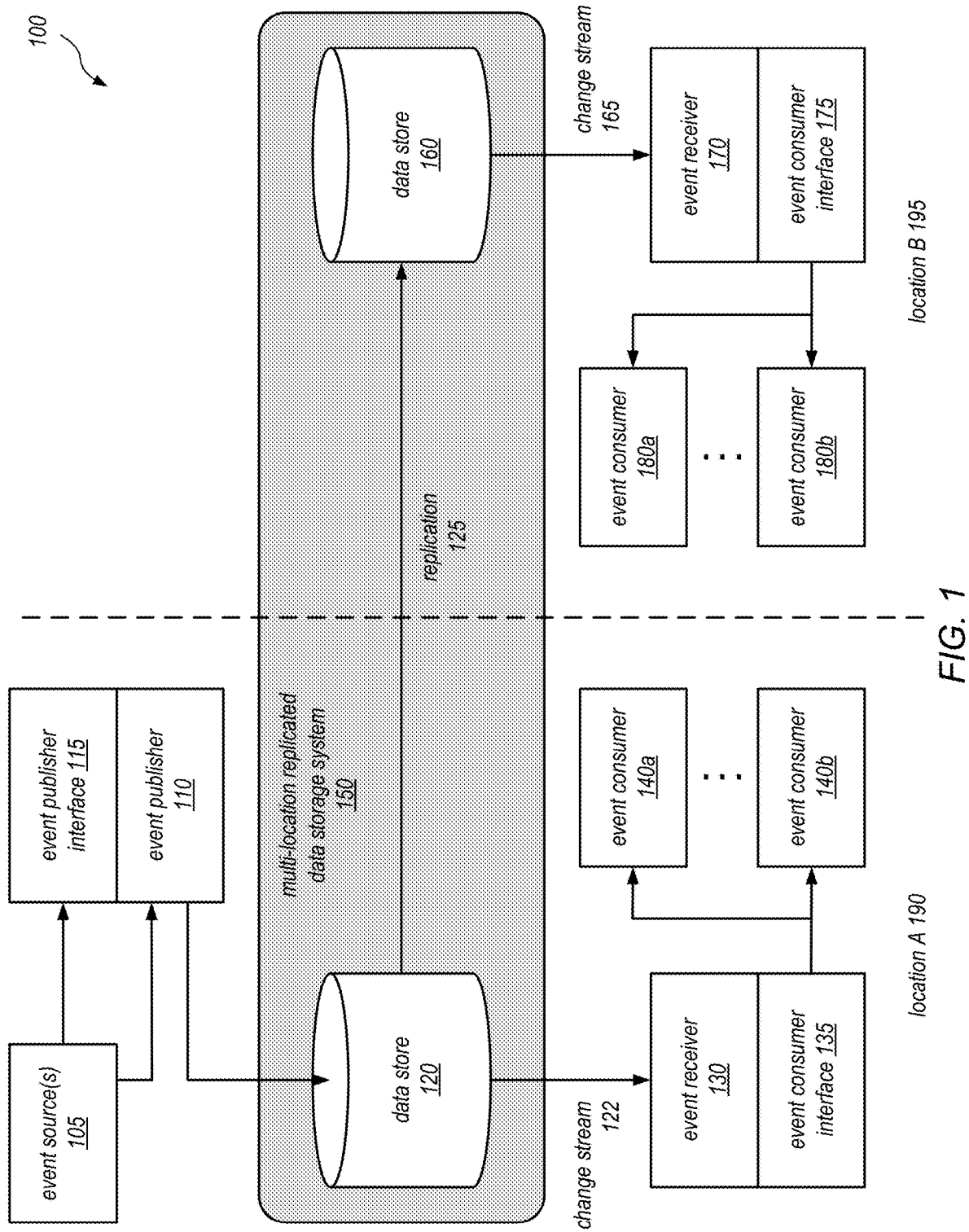
FIG. 1 is a block diagram illustrating an example event publishing system that distributes heterogeneous events across different locations of a distributed system, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

The systems and methods described herein may be employed in various combinations and in embodiments to implement event publishing system that distributes heterogeneous events across different locations of a distributed system, according to some embodiments.

Conventional event delivery systems are not readily usable by different types of applications. Typically, conventional event delivery systems are implemented for their own ad hoc purposes, making such systems unusable outside of their particular application context. Such event delivery systems do not provide sufficient flexibility to handle different event types generated by and for a variety of different applications. This problem is particularly significant in application hosting services, where the service provider network does not have prior knowledge of the types of events that may be generated by their customers' applications. In many cases, customer applications must provide their own event delivery systems, which may be costly to build and inefficient and error-prone during execution.

To address these and other problems with conventional event delivery systems, disclosures herein describe embodiments of an event publishing system that allows different applications the flexibility to send and receive a variety of heterogeneous events across different regions. In some embodiments, the event publishing system may be implemented as a globally accessible service in a service provider network, which allows hosted applications in the network to generate and forward any type of custom event. An event bus may be implemented to provide customers with the ability to originate and broadcast an event in one region of the service provider network to any other region, and to and to consume events from any other regions in the service provider network. The disclosed event publishing system provides a powerful platform to quickly build globally distributed and eventually consistent applications in ways that are not currently possible.

In some embodiments, the event publishing system may provide an interface where a client could originate an event with a particular event name or identifier. The event itself may be presented as any arbitrary data, such as binary large object (BLOB) or another type of binary encoded data. In some embodiments, the event may carry the event metadata, indicating the origin of where it was created, as well as the timestamp of creation, and other metadata. In some embodiments, the event publishing system may persist the event data into multi-location replicated data storage system or service that supports table replication across multiple regions. In some embodiments, the replicated data storage system may implement a replication table group with tables in each region where the client application required event distribution. In some embodiments, the database may also provide an "event expiration" or "time to live" value for individual events, which may cause the event to be eventually deleted from the event publishing system.

In some embodiments, the database system may generate change streams or provide a streaming interface that provides an update or change stream of data objects (e.g. tables) in a replicated data store. In some embodiments, event consumers or an event receiver at an event bus location may be registered to receive or listen for events via the change stream or an event consumer interface. In some embodiments, the underlying transport system for the events may guarantee global eventual consistency across the group of replicated tables. In some embodiments, the event receiver or consumers may be implemented using an event-driven execution service, which may be configured to be invoked in response to data changes in the update or change stream from the data store. In some embodiments, the event-driven execution service may offer efficient storage and archival of event data within the event publishing system repositories. In some embodiments, the event publishing system application programming interface (API) could exposed as a standalone API that consumed data in a region, and defined output regions. In some embodiments, the event receivers at the output regions would in turn be made available as local event sources to provide the events to local applications via a variety of local APIs.

Advantageously, embodiments of the event publishing system described herein employ database replication technology to implement a mechanism for global distribution of heterogeneous events. Accordingly, the event publishing system does not need to implement a separate transport layer for forwarding the events. In some embodiments, the event publishing system generates and maintains metadata for the events, allowing the events to be automatically ordered and filtered based on the metadata. In some embodiments, the event publishing system provides publish and subscribe mechanisms allow a variety of different applications or clients to use the system. In some embodiments, the event publishing system may be provided as a service within a service provider network, allowing hosted applications in the service to easily use the event bus without having to manage the underlying hardware used to support the event bus. In some embodiments, the event bus may be implemented using dynamically provisioned computing resources in the service provider network, which may be configured to automatically scale the resources based on fluctuating demand or automatically recover from partial resource failures. In this manner, the event publishing system may be provided as a robust and universal event publishing system that can be scaled to millions of event publishers and consumers. These and other features and benefits of the event publishing system are described in further detail below, in connection with the figures.

FIG. 1 is a block diagram illustrating an example event publishing system that distributes heterogeneous events across different locations of a distributed system, according to some embodiments.

As shown, in some embodiments, the event publishing system 100 may be implemented using a number of components across different locations, such as location A and location B. As may be understood, in different embodiments, the event publishing system 100 may be implemented across a large number of locations. In some embodiments, each location may be a different geographical location of a distributed system. In some embodiments, each location may be a different data center located at a particular geographic region within a distributed network of data centers. In some embodiments, each location may be a distinct network (e.g. a local area network or LAN) that are connected to the other network locations, but whose network elements are not generally accessible outside of the network.

In some embodiments, the event publishing system 100 may include an event publisher 110, event data stores 120 and 160, and event receivers 130 and 170. In this example, the event publisher 110 is located at location A 190, and location A is the only location that generates events. However, in other embodiments, events may be generated from more than one location connected to the event publishing system.

As shown, the event publisher 110 may provide an event publisher interface 115, which may be used to receive events from one or more event sources 105. In some embodiments, the interface 115 may represent an API that can be programmatically invoked by other software components. In some embodiments, the API may be exposed in a software development kit (SDK), which may be used to allow other application code to invoke the event bus API. In some embodiments, the interface 115 may be a web interface, which may receive requests to publish events in the hypertext transfer protocol (HTTP). In some embodiments, the web interface may be implemented as a representational state transfer (REST) interface. In some embodiments, the interface 115 may be a user interface, such as a graphical user interface (GUI), a command line interface, a voice interface, etc. In some embodiments, the interface 115 may be used to create events based on received input. For example, in some embodiments, the event publisher interface 115 may be used to observe dynamic data, and generate an event to publish on the event bus 100 when certain data conditions are detected.

In some embodiments, the events may not be received as event publish requests via a publisher interface 115. For example, in some embodiments, the publisher 110 may implement an event listener that listens for particular type of events, event data, or conditions. In some embodiments, the event publisher 110 may construct an event record for the event bus, based on observed data conditions. In some embodiments, the event source 105 itself may communicate directly with the data store 120 to interact with the event publishing system 110.

In some embodiments, the event publisher 110 may be implemented using one or more computer systems. In some embodiments, the event publisher 110 may comprise a group of computing nodes, processes, or threads that share the workload of publishing incoming events.

In some embodiments, the event publisher 110 may perform certain processing on incoming data or incoming events before placing the events on the event bus. In some embodiments, the event publisher 110 may generate event metadata for an incoming event. For example, in some embodiments, the publisher 115 may generate an event identifier for an event. The event identifier may be generated randomly, based on a counter of sequence number, or in some embodiments, based on incoming information (e.g. application specified information), such as an event name. In some embodiments, the generated event identifier may uniquely identify the event in the event publishing system during the life of the event. In some embodiments, the publisher 110 may also generate a location identifier that is associated with location A 190. This location identifier may be used to filter events on the event bus or enforce other rules on the events. In some embodiments, the event metadata generated may also include an event timestamp. The event timestamp may be generated based on a clock maintained by the publisher 110. In some embodiments, the clock time when an event is first received by the publisher, or when an event is first created by the publisher, is used as the event timestamp. In some embodiments, the event timestamp may be stored with the event and be used for event filtering or to further process the event.

In some embodiments, the publisher 110 may generate event metadata for events based on incoming event parameters. For example, in some embodiments, the incoming heterogeneous event may include application- or user-specific metadata, which may be unpacked by the publisher and then repackaged as event metadata. In some embodiments, the publisher 110 will not generally implement any application-specific logic, and all of the event metadata generated are generated using a generic processing routine.

In some embodiments, the event metadata may have arbitrary type. For example, in some embodiments, the event metadata may include a map, which maps a number of event tags, attributes, or properties to their respective values. In some embodiments, the attribute map may include an arbitrary number of different attributes, and these attributes may be different from event to event. According, the publisher 110 may reduce all heterogeneous events from a wide variety of applications to a standard form for delivery, and the task of parsing the event attributes are left to the events' potential consumers. In this manner, the event publishing system 100 can be used by a variety of event publishers and consumers, including publishers and consumers that are developed after the event publishing system.

In some embodiments, the event publisher may generate metadata based on one or more policies that govern the operations of the event publishing system. For example, in some embodiments, the publisher 110 may add a destination location metadata attribute to the event. In some embodiments, such an attribute may be used to specify the permissible destination locations for individual events. In some embodiments, if an incoming event does not specify any particular destination location, the event may be forwarded to all known destination locations. In some embodiments, one or more security policy rules may be in place, which may cause invalid destination locations to be removed or revised. As another example, in some embodiments, each event in the system may be assigned a time-to-live (TTL) value, after which it is deleted from the event publishing system (including all data stores 120 and 160). In some embodiments, an event bus policy rule may specify a default TTL value for events, or ensure that a specified TTL value are within a valid range. In some embodiments, such event bus policy rules may be configurable via a configuration interface of the event publishing system.

In some embodiments, the publisher 110 may also perform other processing tasks on the incoming events. For example, in some embodiments, the publisher 110 may construct the payload of the event (e.g., the event data that are not exposed as metadata in the event system). In some embodiments, the event payload may be encrypted using one or more encryption keys provided with the event or dictated by policy. In some embodiments, the event payload may be compressed to reduce the size of the event. In some embodiments, larger events may be split into a number of sub-events, and tagged with metadata (e.g. a chunk number or identifier) so that they can be reassembled at a remote location.

Once the event publisher 110 finishes processing an event, in some embodiments, the event may be stored in a data store 120. In some embodiments, the data store 120 may be an instance of a database or data store, which may be implemented using one or more computer systems. In some embodiments, the data store 120 may be hosted as a cloud-based service, where the user does not actively manage the computing resources used by the data store.

In some embodiments, the event may be saved to a dataset or table within the data store 120. In some embodiments, the data store 120 and 160 may be implemented as parts of a multi-location replicated data storage system 150, as shown. In some embodiments, the data storage system or database 150 may be a database system, such as a SQL or NoSQL database system. In some embodiments, the data storage system or database 150 may implement a replication 125 of the event to the data store 160 at the remote location B 195. In some embodiments, the replication 125 may be performed via a change stream that is transmitted over a network to the remote location B 195. In some embodiments, the data store 120 may implement a feature where an update stream for a table is generated, so that any changes to the data in the table (e.g., inserts, updates, deletes) are added as an update record to the update stream, in the correct order. In some embodiments, the replicated data storage system 150 may implement the replication 125 using the update stream. In some embodiment, the change stream may be provided via a stream repository or stream data store, which is accessible to remote listeners registered to receive the stream. In some embodiments, the data store 120 may implement a feature to implement a group of replicated tables. In some embodiments, the table replication feature may be implemented using the change stream. In some embodiments, the table replication feature may provide change streams in both directions, so that the event data in data stores 120 and 160 stay consistent in response to data changes from both locations A and B.

As discussed, in the event publishing system 100, the replication 125 may occur via a network. In some embodiments, the network may be implemented as part of a service provider network that connects different regions (e.g. data centers) within the service provider network. In some embodiments, the network may be implemented over a public network such as the Internet. In some embodiments, the network may be a private network. In various embodiments, the network may encompass any suitable combination of networking hardware and protocols necessary to establish network communications between region A and region B.

As shown, location B may implement another data store 160. As discussed, in some embodiments, the data store 160 may be used to replicate the event data in the data store 120 in location A. In some embodiments, data store 160 may register as a listener to the change stream, and store the events transmitted in the change stream to location B. As discussed, in some embodiments, the data stores 120 and 160 may implement a feature to implement a group of replicated tables using the change stream. In some embodiments, the table replication feature may provide change streams in both directions, so that the event data in data stores 120 and 160 remain consistent in response to data changes in location A or location B. In some embodiments, the replication to data store 160 may implement a filter feature, which may be used to filter out certain types of events in the change stream. In some embodiments, the filtering may be performed according to configuration parameters, such as a configurable filtering policy, maintained at location B. For example, in some embodiments, the filtering policy may filter out all events that do not specify location B as a destination location in their event metadata.

As shown, both location A and location B in this example may implement an event receiver (event receivers 130 and 170 respectively). In some embodiments, the event receivers may be tasked with obtaining the change stream from a data store, processing the events, and then providing the events to one or more consumers 140 or 180, via an event consumer interface (e.g., interfaces 135 or 175. As shown, at location A, is the events in the data store 120 may be received via the change stream 122. In some embodiments, the change stream 122 may also be used to perform the replication 125 to data store 160. At location B, the events may be received by the receiver 170 via another change stream 165. In general, each location of the event publishing system may implement a different event receiver, so that events published on the event bus can be pushed to any location served by the event bus.

Depending on the embodiment, the processing of events may include a variety of tasks. In some embodiments, the receiver may remove or add certain metadata attributes from or to events in the change stream, before providing them to the event consumers 140 or 180. In some embodiments, the event receiver may provide certain events to certain consumers, and other events to other consumers, based on the events' metadata attributes. In some embodiments, all events are provided to all event consumers, and the consumers themselves may implement the decision as to which events to handle and which events to ignore. In some embodiments, as discussed, the event publisher 110 may divide a large event into chunks. In some embodiments, the event receiver 130 or 170 may merge the chunks back into the large event, before providing the event to consumers. In some embodiments, the event receiver 130 or 170 may decrypt or decompress the events' payload, which may have been encrypted or compressed by the publisher 110. In some embodiments, this task may be an application-specific task and left to the individual event consumers.

As shown, in some embodiments, the event receiver 130 or 170 may provide an event consumer interface 135 or 175 to allow interested event consumers 140 or 180 to receive the events. In some embodiments, the event consumers may simply receive the change stream 122 or 165 itself, and the consumers simply register as listeners at the event consumer interface to receive the update stream. In some embodiments, as discussed, the event receiver may modify the events in the update stream before providing the events to the consumers. In some embodiments, the event consumer interface 135 or 175 may provide a different type of event interface, such as for example another event repository, a callback mechanism, another type of stream, etc.

In some embodiments, the event consumer interface 135 or 175 may provide a pagination functionality that allows received events to be provided in batches or pages to the event consumers. In some embodiments, the event consumer interface may also provide a checkpoint token or pagination token along with each batch or page of events, which allows the consumers to request a next page or batch of events.

In some embodiments, the event consumer interface 135 or 175 may be provided as an API. In some embodiments, the event consumer interface may be implemented as part of a software library. In some embodiments, the event consumer interface may be implemented a web interface. For example, the event consumer interface may be implemented using the HTTP protocol or as a RESTful web service.

In some embodiments, the event consumers 140 or 180 may be any type of application, service, or process that are interested in receiving events from the event publishing system 100. In some embodiments, a consumer may be implemented as an event driven component, which is invoked in an execution environment in response to any received events. In some embodiments, an event consumer may be implemented as an ongoing service or background process. In some embodiments, an event consumer may implement a log or a data store, which is configure to log or store certain events for further processing. In some embodiments, the event consumers themselves may implement additional event communication interfaces for other software applications or services running locally in the location. In some embodiments, an event consumer application or service may also act as an event generator, which generates one or more heterogeneous events for the event publishing system 100.

Figure 2A:
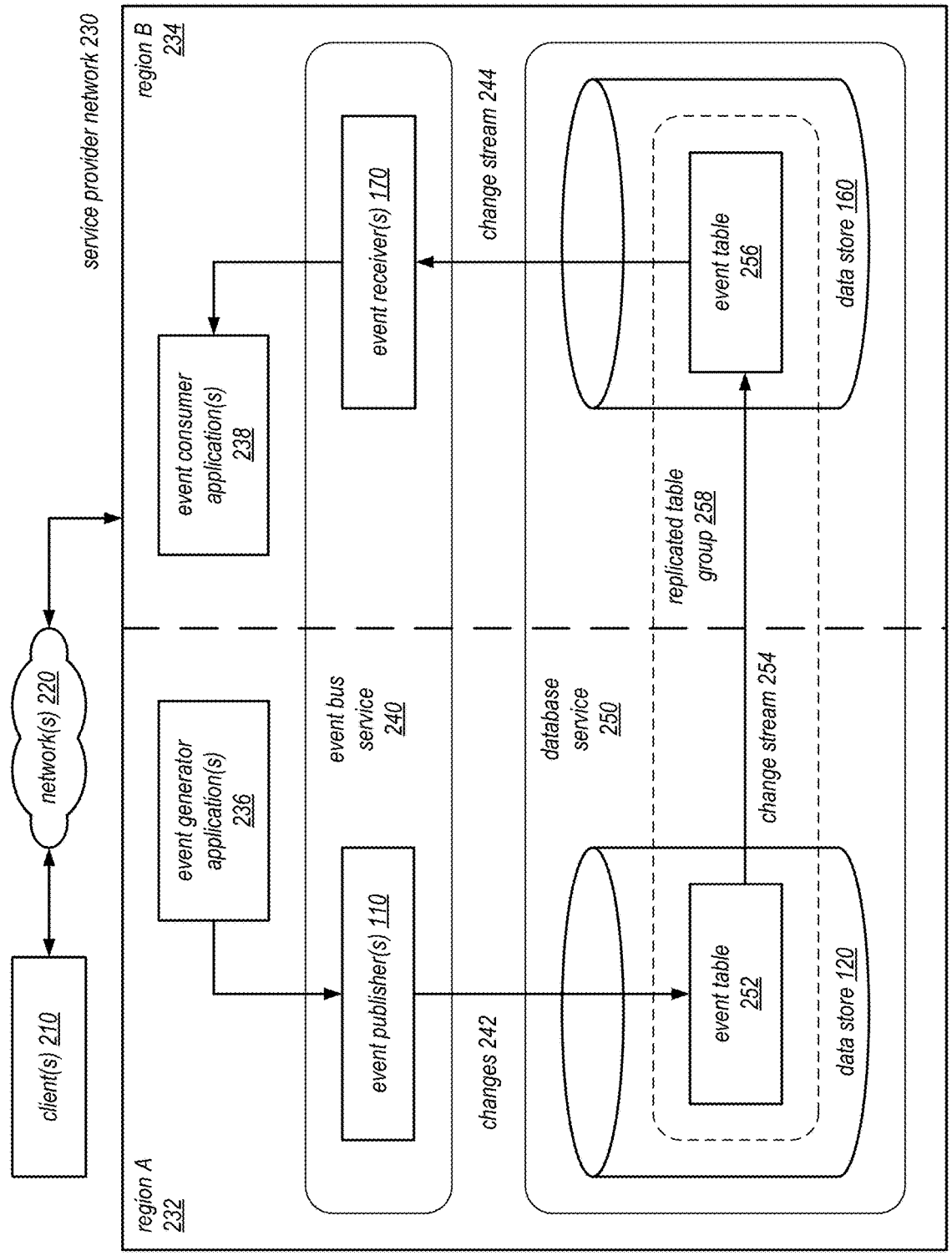
FIG. 2A is a block diagram illustrating an example event publishing system that distributes heterogeneous events across regions of a service provider network, according to some embodiments.

FIG. 2A is a block diagram illustrating an example event publishing system that distributes heterogeneous events across regions of a service provider network, according to some embodiments. As shown, the figure depicts a service provider network 230, which may be used to provide services to one or more clients 210 over one or more networks 220. As shown, in some embodiments, components of the event publishing system 100 of FIG. 1 may be implemented as separate services in a cloud-based service provider network 230.

In some embodiments, clients 210 of the provider network 230 may provide access the services via the service interfaces of the services, which may be exposed via a network such as network 220, as shown. In some embodiments, the network 220 may be a public network such as the Internet.

The client(s) 210 for the provider network 230 may encompass any type of client configurable to submit service requests to a provider network. In some embodiments, a client 210 may include a suitable version of a web browser or a plug-in module for a web browser, or other type of code module configured to execute as an extension to or within an execution environment to provide database or data storage service clients (e.g., client applications, users, and/or subscribers) access to the services provided by provider network. Alternatively, a client 210 may encompass an application such as a database application, media application, office application or any other application that may make use of persistent storage resources. In some embodiments, an application may include sufficient protocol support (e.g., for a suitable version of Hypertext Transfer Protocol (HTTP)) for generating and processing web services requests without necessarily implementing full browser support for all types of web-based data. A client 210 may be an application configured to interact directly with the services. In some embodiments, a client 210 may be configured to generate web service requests according to a REST-style web services architecture, a document- or message-based web services architecture, or another suitable web services architecture.

In the service provider network 230, each of the services may be implemented using one or more service endpoints configured to receive and process services requests. For example, the database service 250 may service requests to access tables maintained on behalf of clients 210 by a data store, and/or the items and attributes stored in those tables. For example, the services may include hardware and/or software configured to implement various service endpoints and to properly receive and process HTTP-based web services requests directed to those endpoints. In one embodiment, the services may be implemented as a server system configured to receive web services requests from clients and to forward them to various components that collectively implement a data storage system, event-driven execution system, object storage system, etc., for processing. In other embodiments, the services may be configured as a number of distinct systems (e.g., in a cluster topology) implementing load balancing and other request management features configured to dynamically manage large-scale web services request processing loads.

In various embodiments, the components in the services may be implemented directly within computer hardware, as instructions directly or indirectly executable by computer hardware (e.g., a microprocessor or computer system), or using a combination of these techniques. For example, the components of the database service 250 may be implemented by a distributed system including a number of computing nodes. In some embodiments, the functionality of a given storage service system component may be implemented by a particular computing node or may be distributed across several computing nodes. In some embodiments, a given computing node may implement the functionality of more than one service system component.

In some embodiments, the APIs provided by the services may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

In some embodiments, the event publishing system 100 may be built using the various services of the service provider network 230. As may be understood, an event publishing system built in this manner may represent an easy and cost-effective solution that can be constructed without extensive new development.

As shown, in some embodiments, the service provider network 230 may be divided into regions, such as region A 232 and region B 234. In some embodiments, the regions may represent different sub-networks within the service provider network, different regional data centers, or different availability zones that include distinct groups of redundant computing resources to maintain high service availability.

As shown, in some embodiments, the event publishing system 100 may be implemented as an event bus service 240. In the event bus service 240, the event publishers 110 and event receivers 170 may be implemented in the service as distinct compute nodes or virtual machine instances. In some embodiments, the provisioning of these nodes or instances may rely on another underlying service of the service provider network that provides on-demand computing node instances. In some embodiments, the applications 236 and 238 may be maintained on a pool of nodes or instances. In some embodiments, the size of the pool may be automatically scaled based on service demand. In some embodiments, failing nodes or instances may be automatically removed from the pool and replaced with new instances or nodes.

In some embodiments, the event receiver(s) 170 or event consumer applications 238 may be implemented as an event-driven component that is invoked from within an event-driven execution service. In some embodiments, the execution service may comprise a stateless, server-less platform that invokes or triggers functions, such as the update and snapshot publish functions, in response to detected events. In some embodiments, the execution service may host a large number of client-defined functions, which are launched or triggered based on detected events. For example, a triggering event may comprise an asynchronous event received by the event receivers 170, such as for example data changes in a change stream that the event receivers are registered to listen to. In some embodiments, the event-driven execution service may maintain computing resources, which may be kept in a standby or frozen state when no events are detected. Once an event is detected, the event-driven execution service may very quickly launch the appropriate function to handle the event (e.g., a consumer application 238), using the needed computing resources (e.g., a virtual machine instance and/or an execution container for the function).

In some embodiments, other types of services may be used to implement the event consumer applications 238. For example, one event consumer application may simply implement an event repository, which may be implemented using the database service 250.

As shown, in some embodiments, the data stores 120 and 160 in the two regions may be implemented using the database service 250. In some embodiments, the database service 250 may implement the multi-location replicated data storage system 150 of FIG. 1. As shown, the event publishers may issue updates or changes 242 to an event table 252 in the data store 120, and the event receivers 170 may receive the update stream 244 generated for another event table 256 in the data store 160.

In some embodiments, the database service 250 or multi-location replicated data storage system 150 may provision computing resources to support different database or data store instances, such as data stores 120 and 160. For example, in some embodiments, the data stores may be hosted on one or more compute nodes or storage nodes in the service 250, which may be implemented as virtual machine instances running on virtualization hosts. In some embodiments, the compute or storage nodes may be provisioned or deprovisioned dynamically, based on factors such as the amount of data stored in the data stores, or the rate of requests that are directed to the data stores.

As shown, the event tables 252 and 256 may both below to a replicated table group across the two data stores 120 and 160. In some embodiments, the database service 250 or multi-location replicated data storage system 150 may support a feature to provide a group of such replicated tables. In some embodiments, the replication is performed via an update stream 254, which includes all changes made to the event table 252 (e.g., any inserts, updates, or deletes). The data store 160, in turn, takes the update stream 254 and applies the changes in the stream to the event table 256 to replicate the contents of the event table 252. In some embodiments, the replication may occur in both directions, so that changes to event table 256 are also sent back to data store 120 via another update stream. In some embodiments, the data stores 120 and 160 may implement two-phase commit process to correctly handle conflicting updates between the two tables 252 and 256. Although only two locations and two tables are shown in the figure, in some embodiments, the event bus service and system may be implemented over any number of regions and tables, ensuring eventual consistency across these replicated tables. Accordingly, an event bus service 240 can be easily implemented over the set of replicated tables in the replicated table group 258 without extensive development efforts.

Figure 2B:
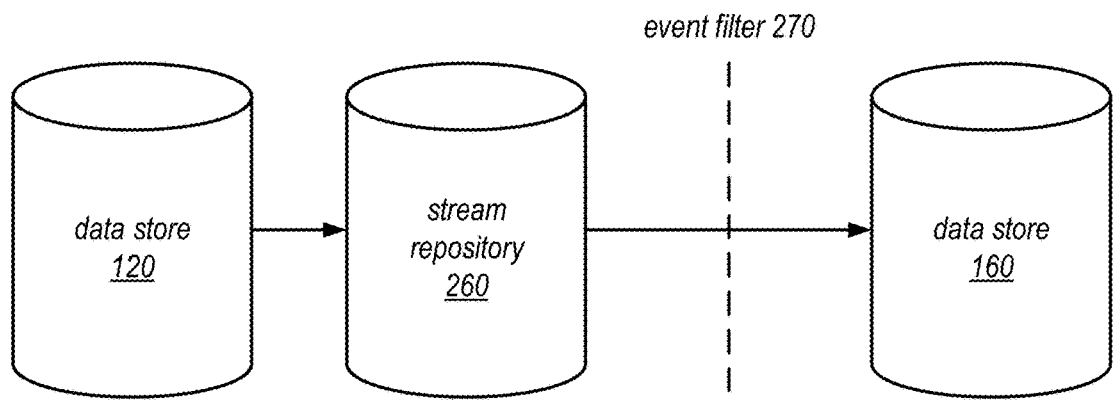
FIGS. 2B to 2D are diagrams illustrating different event filtering components in the event publishing system, according to some embodiments.
Figure 2C:
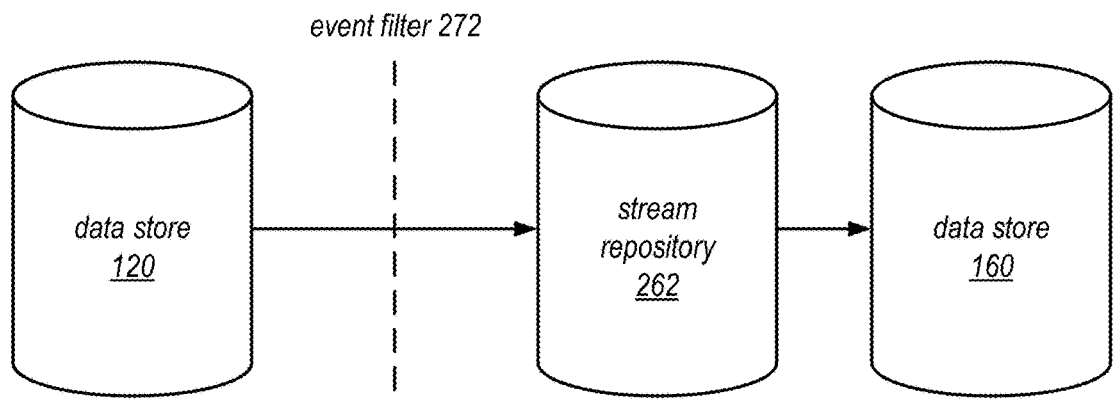
Figure 2D:
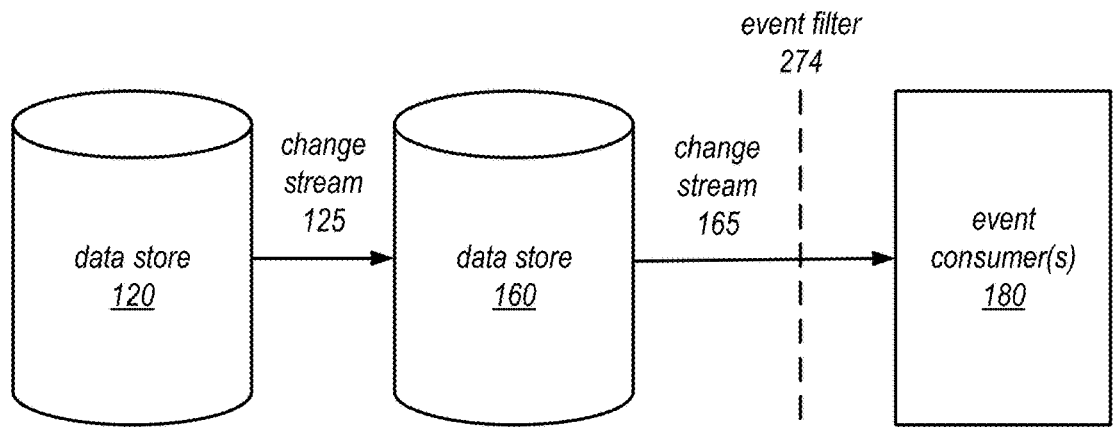

FIGS. 2B to 2D are diagrams illustrating different event filtering components in the event publishing system, according to some embodiments.

FIG. 2B depicts the source data store 120 and the destination data store 160, as discussed in connection with FIG. 1. As shown, in some embodiments, a replication (e.g. replication 125 of FIG. 1) may be implemented using a stream repository 260. In some embodiments, the stream repository 260 may comprise another data store instance hosted in the database service 250, as discussed in connection with FIG. 2A. In some embodiments, the stream repository 260 may be exposed via a streaming service of the service provider network, which allows users to easily access a stream of data records in sequence. In some embodiments, the streaming service or stream repository 260 may delete stream records that are older than a certain age. In this manner, the storage requirements of the stream repository 260 is limited to a relatively small size.

As shown, in some embodiments, the source data store 120 may generate its change stream into the stream repository 260. In some embodiments, the destination data store 160 may receive the contents of the stream repository 260, as shown. The destination data store 160 may obtain the events via either a push or a pull mechanism. For example, in some embodiments, the stream repository may proactively push received events to the destination data store, while in some embodiments, the destination data store may periodically poll and retrieve events from the stream repository.

As shown, in some embodiments, and event filter 270 may be implemented for events transmitted from the stream repository 260 to the destination data store 160. In some embodiments, in this configuration, there is only one stream repository 260 for the source data store 120. In some embodiments, a different event filter 270 may be implemented by each different destination data stores 160, so that different sets of events are downloaded to each location or region.

As discussed, depending on the embodiments, events may be filtered as they are transmitted to remote locations, so that certain locations will only receive certain types of events generated by the source data store 120. For example, in some embodiments, event metadata may specify one or more intended destination location for an event, so that if a particular destination location is not one of the intended destination locations, the event may be filtered out before or at the particular destination location. In some embodiments, the filtering may be controlled by one or more specified filtering criteria that is associated with individual events. In some embodiments, the filtering component's behavior may be controlled by a configurable filtering policy. In some embodiments, the filtering policy may be specified in rules or expressions that indicate metadata values for events that are to be filtered out.

FIG. 2C depicts a different configuration, where the event filter 272 is implemented before events are received by a stream repository 262. In this configuration, events from the source data store 120 are filtered by the event filter 272 before the filtered results are stored in the stream repository 262. In some embodiments, this configuration may be used in systems where there is one stream repository for each destination data store 160. For example, the stream repository 262 and destination data store 160 may reside in the same region or location. In some embodiments, the event filter 272 may be implemented at the location of the source data store 120, which may have knowledge of all locations or regions that are part of the event publishing system. In some embodiments, the event filter 272 may be implemented at each of the individual stream repositories 262 that receive events from the source data store 120.

FIG. 2D depicts another configuration of filtering. In this configuration, the event filter 274 is implemented on the change stream 165 generated from the destination data store 160 to the event consumers 180. For example, in some embodiments, the event filter 274 maybe implemented as part of the event receiver 170 of FIG. 1. In some embodiments, the event receiver 170 may filter the event data provided to the event consumers 180. In some embodiments, each consumer may be associated with a different filter, and receive different sets of events. In some embodiments, such consumer-specific filters may be provided when the consumers register as listeners to the event consumer interface 175. In some embodiments, some of the consumers themselves may implement additional event filters.

In some embodiments, multiple ones of the event filters 270, 272, and 274 may be implemented at different stages of the event publishing system 100. For example, in one embodiment, the events from the stream repository 260 may be filtered on the way to the destination data store 160, as shown in FIG. 2B, and then filtered again from the destination data store 160 the consumers 180, as shown in FIG. 2D. In some embodiments, a first filter may filter at the location level, excluding from the incoming stream any events that are not intended for a location. A second filter may then be applied at the application level, excluding events that are not directed to particular applications.

FIG. 3 illustrates an example event table that may be used to implement an event publishing system for heterogeneous events, according to some embodiments. In some embodiments, the event table 300 depicted may be the event table 252 or 256, as discussed in connection with FIG. 2. In some embodiments, the event table 300 may be part of a replicated table group, such as replicated table group 258, which are replicated at different locations that implement the event bus architecture.

As shown, the event table 300 in this example includes a number of fields. These fields may represent event metadata that are used by the event publishing system. In some embodiments, some or all of these metadata attributes may be generated by the event publishing systems, for example, by the publisher 110 of FIG. 1. In some embodiments, some of the metadata attributes may be specified by a client to the event publishing system. In some embodiments, the metadata attributes may be generated based on one or more client-specified parameters.

As shown, field 310 is an event name. In some embodiments, the event name 310 may be provided by the event bus client. As shown, the event table may also have a sequence number field 312. In some embodiment, the sequence number may be generated by the event publishing system both to provide uniqueness to the events in the system and also indicate an ordering of the events (e.g. the order in which the events were received or published). In some embodiments, the sequence numbers may be unique only in one region or location. In some embodiments, the sequence numbers may be unique across all locations or regions of the event publishing system.

As shown, the event table 300 also includes a source attribute 314. In some embodiments, the source attribute may indicate the source location or region where an event originated. In some embodiments, the event publisher may be responsible for adding this attribute to all incoming events.

As shown, in some embodiments, the combination of the event name 310, the sequence number 312, and the source location ID 314 may represent a globally unique event ID 305. In some embodiments, further metadata about a single event in the event publishing system may reference the globally unique event ID 305. For example, metadata about the status of the event in the event publishing system may be tracked via the globally unique event ID. In some embodiments, other combinations of attributes or fields may be used to provide the globally unique event ID. For example, in some embodiments where the sequence number is unique across all regions of the event publishing system, the source attribute may not be used as part of the globally unique event ID.

In some embodiments, the database system hosting the event table 300 may be implemented to partition its data into partitions, which may be independently managed by different nodes in a distributed system. In some embodiments, different data items or records in the table may be assigned to different partitions based on an attribute called the partition key. In some embodiments, the partition key may be hashed to determine the partition for each data item or record. In some embodiments, different combinations attributes in the table may be used as the partition key. For example, in some embodiments, the event name 310 may be used as the partition key. In some embodiments, the combination of event name, the source ID, and a randomly generated value may be used as the partition key.

In some embodiments, in database systems that implement partitioned tables, data items or records may be sorted within each partition in a sorted order. This may be done in order to facilitate certain types of queries. In some embodiments, the sorting may be performed according to a sort key attribute in the table. For example, in the table 300, the sequence number 312 may be used as the sort key. As another example, the timestamp 318 may be used as the sort key.

As shown, the event table 300 may include a destination field or attribute 316. In some embodiments, the attribute may indicate an intended destination location for the event. In some embodiments, the destination attribute may be specified by the client to limit where the event is published to. As shown, in this example, event 330 is to be broadcasted to all regions, which may be the default value for the destination field. However, event 332 is broadcast to only the US-West-1 and US-West-2 regions. Similarly, event 334 is only broadcast to the US-West-1 and US-West-2 regions. In some embodiments, the selective broadcasting may be implemented using event filters, as discussed in connection with FIGS. 2B-2D. For example, in some embodiments, the event receiver at the destination location may filter out any events that do not indicate its location ID in the destination field. In some embodiments, event filtering may be performed at the source location or region.

As shown, the event table 300 may include a timestamp attribute or field 318. In some embodiments, this timestamp value may represent a time when an event was first received by the event publishing system (e.g. the event publisher). In some embodiments, the event timestamp may be the time when an event was first stored in the event table 300. In some embodiments, the event timestamp may not be generated by the event publishing system, but be provided by the client. In some embodiments, event filters may filter events based on the event timestamp. For example, the event publishing system may be used to implement a system where events are always directed to one regional server based on the time of day. Thus, every region may implement a filter to only accept events during a particular time window.

As shown, the event table may implement a time-to-live (TTL) field or attribute 320. In some embodiments, the TTL may indicate how long an event should be persisted in the event publishing system. As may be understood, the event publishing system may not be a long-term persistent store, and may not have the storage capacity to save large amounts of old events. Thus, in some embodiments, the event publishing system will periodically delete old events in the system, in accordance with the TTL value. In some embodiments, the TTL value 320 may be specified by the client. In some embodiments, the TTL value may be updated by the event publishing system under certain conditions. As shown, for some events, the TTL value maybe zero, such as for event 330. In that case, the event may be delivered to the remote regions (and remote event listeners), but it may not be persisted for any length of time. For example, as soon as the event is written to the event table (and thus placed in the change stream), the event may be flagged for deletion. For other events, such as events 332 and 334, the TTL value may be non-zero, indicating that the event should be persisted in the event table for some time. In some embodiments, the allow some event consumers to access the event at a later time from the table. In some embodiments, the TTL may be based on the event timestamp 318, so that the same event will expire at the same time in different regions or locations.

In some embodiments, the deletion of an event from the event table 300 may generate a separate notification to the event consumers. For example, in some embodiments, events that are deleted in one data store of the multi-location replicated data storage system will cause all copies of the event in all other data stores of the replicated system to be deleted. In some embodiments, the deletion will appear as an event in the change stream of all data stores in the event bus. In some embodiments, the event receivers may be configured to provide notification of the deletion of the event to interested event consumers. In some embodiments, the event consumers may be configured to take action in response to the deletion of an event. In some embodiments, the event receivers or event consumers may be configured to simply ignore such deletions based on the TTL.

As shown, the event table 300 may include a client metadata field 332. In some embodiments, this field may include attribute values that are not used by the event publishing system, but simply passed on to the event consumers. In some embodiments, this client metadata may be provided by the client that published the event. In some embodiments, the event consumers may handle an event different (e.g. filter the event) based on this additional client metadata. As shown, this client metadata may include information such as a client ID (generator=A), an intended recipient (listener=log), and other types of application-specific information (level=0, type=sys, etc.). In some embodiments, this additional metadata for the events may be stored as a map. For example, in some embodiments, the map may specify arbitrary tags and associated values (e.g. tag="generator" and value="A"). In this manner, the event publishing system allows the events to carry any arbitrary metadata, so that the event bus can be used to transport a variety of heterogeneous events. In some embodiments, the client metadata field 322 may also be viewed and modified by components in the event publishing system itself, allowing the system to easily extend its own functionality.

As shown, in this example, a group of events 336 is stored in the event table 300. The events 336 may represent multiple chunks of a single event. In some embodiments, a single event may exceed a size limit (e.g. a client size limited or a size limit associated with the event publishing system). Thus, in some embodiments, either the client or the event publishing system may divide a large event into chunks, and transmit the chunks across the event publishing system separately. In some embodiments, the chunks may be labeled with chunk numbers or identifiers, allow them to be reassembled at the receiving end. In this example, the chunk numbers are added to the client metadata 322. In some embodiments, the event table 300 may include additional fields for the chunking mechanism, so that the event publishing system can easily handle the dividing and reassembly of event chunks.

As shown, in this example, the actual event data are stored in another field 324 in the table 300. In some embodiments, as shown, the event data may be encrypted. In some embodiments, the event data may also be compressed. In some embodiments, the event publisher may perform the encryption or compression before the event is placed onto the event bus, and the event receiver may perform the decryption and decompression upon receipt of the event. In some embodiments, the encryption and compression may be performed by the event bus client, to be decrypted and decompressed by the receiving event bus client.

In some embodiments, the encryption performed using an envelope encryption protocol, where the data itself is encrypted using a data encryption key (DEK), and the DEK and encrypted data are then collectively encrypted using a key encryption key (KEK). At the receiver end, the event receiver or event consumer may call a decryption service to obtain the event data, by first decrypting the received content using the KEK, and then decrypting the event using the DEK. In some embodiments, access to perform the decryption may be controlled by a key management service, which may be a service hosted by the service provider network 230 of FIG. 2. In some embodiments, clients that need to decrypt an encrypted event must first be authorized to perform the decryption at the key management service. In some embodiments, the KEK may be a per-client master key that is maintained within the key management service and never revealed to other clients during the decryption process. Accordingly, event generating applications can generate encrypted events using its master key without having to share its master key with event consumer applications.

Figure 4:
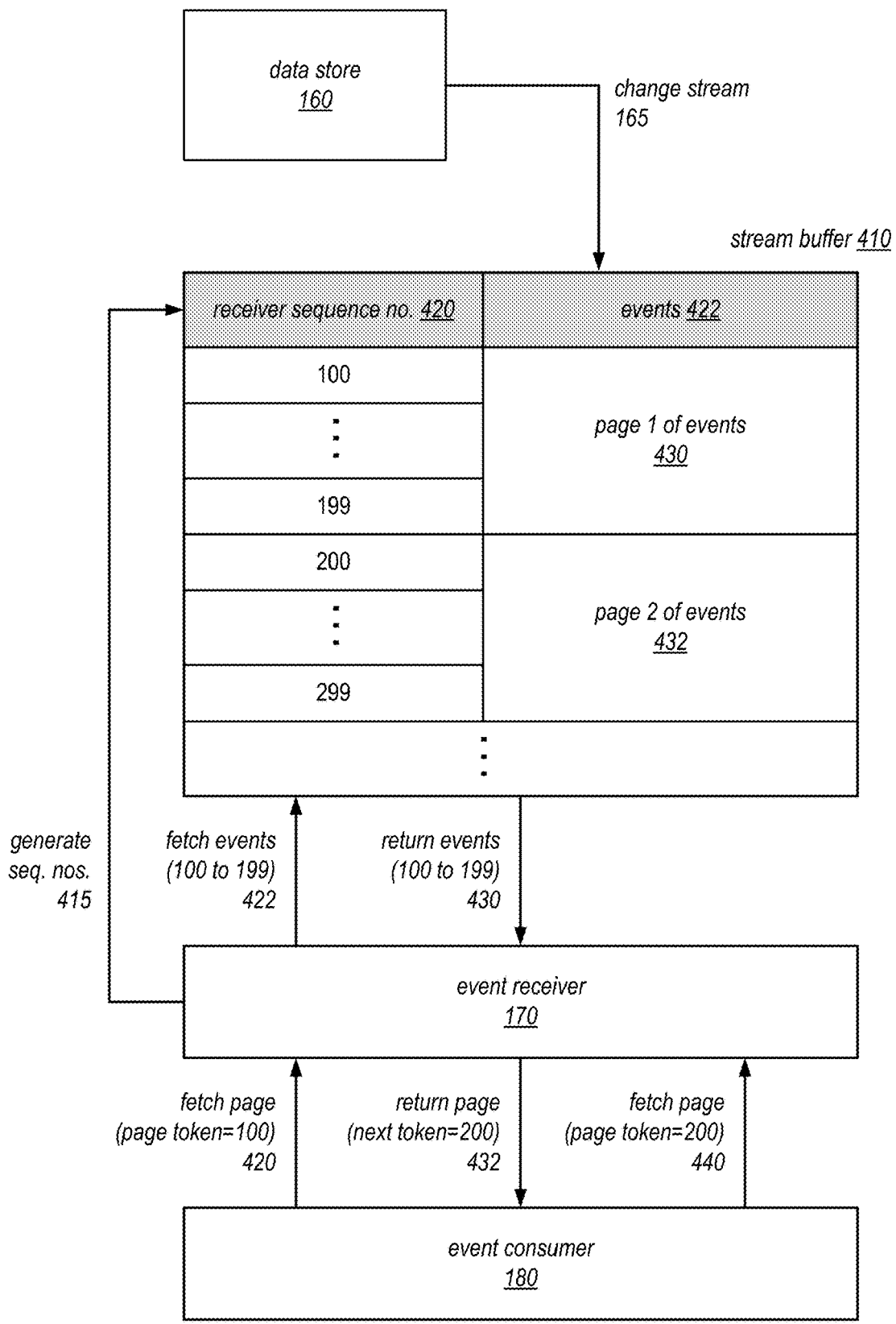
FIG. 4 illustrates an example process of providing paginated access to events in an event publishing system for heterogeneous events, according to some embodiments.

FIG. 4 illustrates an example process of providing paginated access to events in an event publishing system for heterogeneous events, according to some embodiments. In some embodiments, the depicted pagination process may be performed by the event receiver 170, as discussed in connection with FIG. 1.

As shown, in some embodiments, the data store 160 may generate a change stream 165, as discussed in connection with FIG. 1. In some embodiments, events in the change stream 165 may buffered in a stream buffer 410. In some embodiments, the stream buffer 410 may be implemented as part of a stream repository configured to temporarily store streaming data, which may be the underlying data store that houses the change stream 165. In some embodiments, the stream buffer 410 may be a different data store from the change stream 165. In some embodiments, the stream buffer 410 may be maintained by the event receiver 170.

As shown, the stream buffer 410 stores the events 442 with a receiver sequence number 420, and in pages. In this example, the events 422 are stored in order of their receiver sequence number 420, and in pages of 100. Thus, page 1 430 of events has events 100 to 199, and page 2 432 of events has events 200 to 299. In some embodiments, the sequence number 420 may be generated 415 by the event receiver 170. In some embodiments, the receiver sequence numbers may be implemented as part of the change stream 165.

As shown, the event receiver 170 may implement a pagination interface that returns the events 442 to the event consumer 180 in pages. In some embodiments, even though the even consumer 180 receives a push notification of the event, it does not actually receive the event data. In some embodiments, the event consumer may access the events via another mechanism, for example via periodic polling or page fetches from the event receiver 170.

As shown, in this example, the event consumer 180 sends a fetch page request 420 to the event receiver 170. The fetch request specifies a page or pagination token, indicating that the requested page of events is to start at event number 100. This causes the event receiver 170 to fetch 422 a page of 100 events, starting at event number 100, to event number 199. At operation 430, the page of events is obtained by the event receiver. At operation 432, the page of events is returned to the event consumer 180, along with another page or pagination token, indicating that the next page of events starts at event number 200. In some embodiments, it is up to the event consumer to keep track of this pagination token to access the next page of events. As shown, at operation 440, the event consumer 180 can request the next page of events by specifying the pagination token (200) received earlier. The event receiver 170 may then respond with page 2 of events 432, starting at event number 200. As may be understood, this process implements a pagination mechanism where the event receiver 170 is not required to maintain paging state for any of its clients. Thus, when a large burst of events arrives at the event receiver, the event receiver can buffer the events, send a notification to registered clients, and then allow the clients to consume these events at their own pace.

Figure 5:
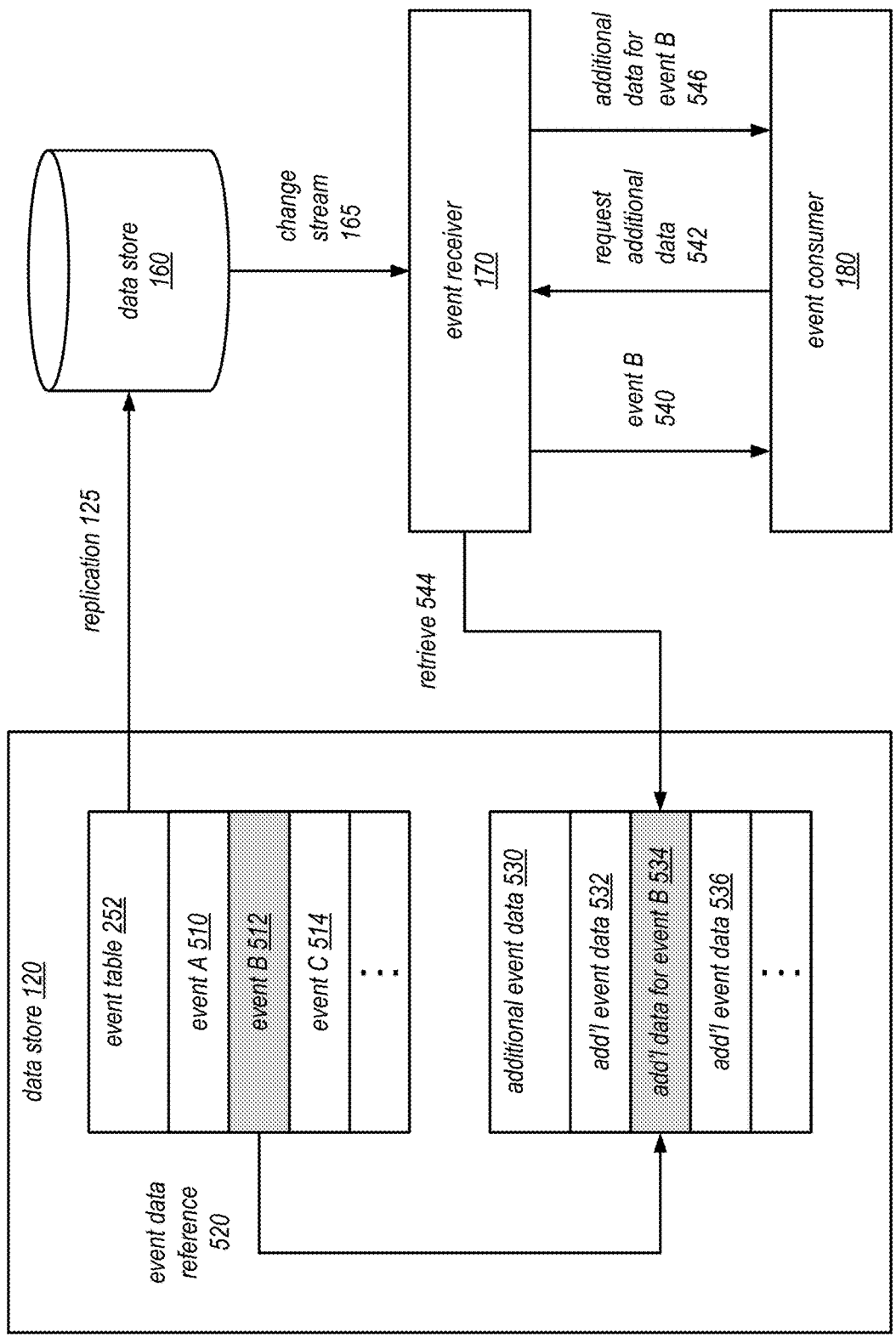
FIG. 5 illustrates an example process of providing and using an event data reference in an event publishing system for heterogeneous events, according to some embodiments.

FIG. 5 illustrates an example process of providing and using an event data reference in an event publishing system for heterogeneous events, according to some embodiments. As shown, the depicted process may be implemented using the event receiver 170, as discussed in connection with FIG. 1.

As shown, in some embodiments, the source data store 120 may employ two tables (or storage locations) for the events. First, an event table 252 may be used, as discussed in connection with FIG. 2A. The event table 252 may store some portion of event data, and changes to the event table 252 may be added to the change stream 254, and replicated to the data store 160. Second, the data store 120 may store another portion of the event data in another table for additional event data 530. Changes to the additional event data table 530 may not be added to the change stream 254, and replicated to the data store 160. In some embodiments, an event in the event table 252 (e.g. event 512) may contain a data reference 520 to data in the additional event data table 530 (e.g. event data 534).

As may be understood, in operation, although the data for event B 512 in table 252 is broadcast on the event bus via a replication mechanism 125, the additional data 534 in table 530 is not. In some embodiments, this technique may be used to limit the size of events that are transmitted on the event bus in order to reduce network traffic on the event bus. For example, event B may include a very large data object, and broadcasting that data object to remote regions across the event bus may consume excessive network bandwidth. In some embodiments, the use of the additional event data table 530 may be specified by the publishing client. For example, in an event publishing request, the client may specify that a portion of the event payload should be stored locally but not immediately broadcast over the event bus.

As shown, replication 125 delivers the data 512 for event B to the remote data store 160, which in turn delivers the event data 512 to the event receiver 170 via change stream 165, as discussed in connection with FIG. 1. In some embodiments, the event receiver 170 may implement an API that allows an event consumer 180 to retrieve 544 the additional data for event B 534. For example, a certain event consumer 180 may receive the data 512 for event B (at operation 540) and decide that it is interested in obtaining the additional data 532 for event B.

In some embodiments, the event consumer may send a request 542 to the event receiver 170 to retrieve the additional data 534 for event B. In some embodiments, the request 542 may specify the event data reference 520 for the additional data. In some embodiments, this reference may indicate the region or location that is storing the additional data, as well as a record ID or key that identifies the additional data 534 for event B. In some embodiments, the event consumer 180 may use the data reference to retrieve the additional data 534 by itself, without using the event receiver 170.

In some embodiments, in response to the request 542, the event receiver 170 may retrieve 544 the additional data 534 for the consumer. The event receiver 170 may then return the additional data 534 to the requesting consumer 180 via operation 546. As may be understood, using the depicted process, large data objects such as the additional data 534 for event B may not be transmitted over the event bus. Rather, such data are kept locally at the source location or region, and provided only when requested by remote consumers. In this manner, network capacity on the event bus may be maintained at a high level.

Figure 6:
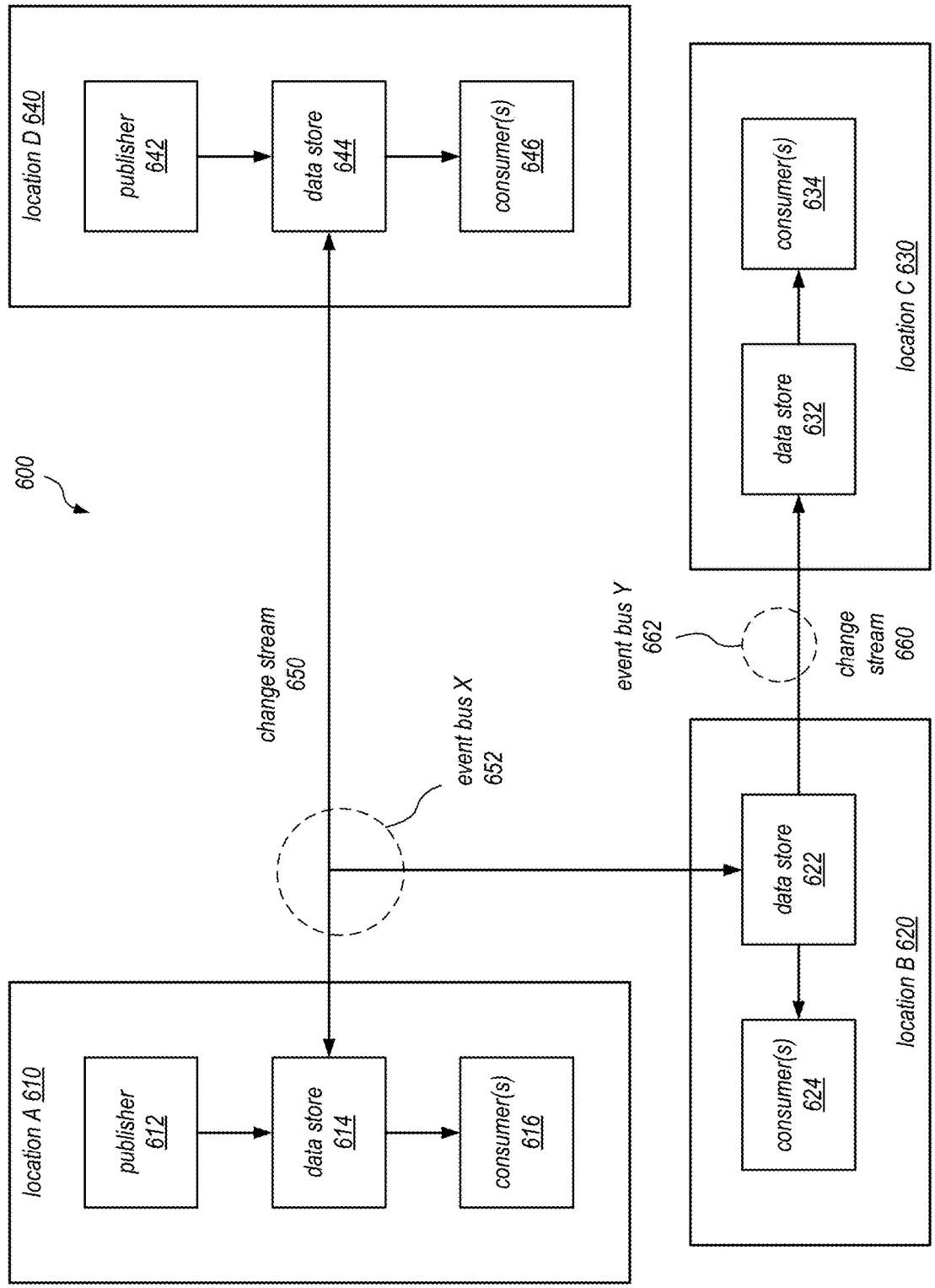
FIG. 6 illustrates an example configuration for an event publishing system for heterogeneous events that is composed of a number of different locations, according to some embodiments.

FIG. 6 illustrates an example configuration for an event publishing system for heterogeneous events that is composed of a number of different locations, according to some embodiments.

As shown, the event publishing system 600 includes four locations, location A 610, location B 620, location C 630, and location D 640. In some embodiments, these locations may be different locations, such as locations A and B in FIG. 1, or different locations, regions, data centers, availability zones, etc., as shown in FIG. 2A.

As shown, each location includes a data store (e.g. data stores 614, 622, 632, and 644) and one or more event consumers (e.g. consumers 616, 624, 634, and 646). As shown, the data stores of the locations are connected via networks so certain data stores receive a change stream from one or more other data stores. As discussed, in some embodiments, these data stores may include event tables that are part of a replicated table group (e.g. group 258 of FIG. 2A). In some embodiments, the change streams may be update streams generated by the data stores.

As shown, in some embodiments, two data stores may send change streams or update streams to each other, so that the replication is occurring in both directions. For example, as shown, both locations A and D have an event publisher (publisher 612 and 642), and thus, both locations can generate new events. Accordingly, the change stream 650 may be a bi-directional change stream, where events can flow from location A to D, and also from location D to A. In some embodiments, because the data store in this configuration can receive updates from two different sources (e.g. the local publisher and the remote data store), the data store may implement a protocol to resolve update conflicts from the different sources. For example, in some embodiments, the writes to the data store may not be immediately finalized. In some embodiments, the data store may employ a two-phase commit process where a write to the data store may not be fully finalized until the system confirms that the write does not cause any conflicts across the multiple locations.

As shown, in some embodiments, more than two data stores may be connected. For example, in the figure, the data store 622 at location B also receives the change stream 650. However, location B does not have an event publisher (it is a read-only location), and thus it never generates its own change stream. Depending on the embodiment, any number of data stores or event bus locations may be connected to receive the same change stream (or write to the change stream). In some embodiments, the change streams may be implemented as a point-to-point system. In some embodiments, the change streams may all be stored at a centralized change stream repository. In some embodiments, as discussed, the event transport layer may be implemented using a table replication feature of the database system used to implemented the data stores, for example, using the multi-location replicated data storage system 150 of FIG. 1. For example, data stores 614, 622, and 644 may all implement a replicated table that is part of a same replicated table group. In some embodiments, the replication group may form a single instance of an event bus X 652 maintained in the event publishing system.

As shown, in some embodiments, locations may be chained, so that a first location sends events to a second location, and the second location in turn sends the events to a third location that is not connected to the first location. In this example, locations A and D send their events to location B, and location B then sends these events to location C 630, via its own change stream 660. In some embodiments, the change stream 660 may be implemented in similar fashion as change stream 650. In some embodiments, the data stores 622 and 632 may form a second replicated table group, which corresponds to a second instance of an event bus Y 662 maintained by the event publishing system.

As may be understood, using the event bus architecture described herein, a multi-location event publishing system is created. Accordingly, event generating applications at any location having an interface to the event bus can place any event on the bus, to be transported to any other location connected to the event bus. As discussed, the event may have arbitrary metadata, so that any application can use the event bus to communicate with any remote event consuming applications. By limiting the size of events that are placed on the event bus and the time that events are stored in the data stores, the event system may be implemented with very low storage or network requirements. Moreover, by layering the event bus over a database system that employs replicated table groups, the event bus can be quickly installed at different sites with very little configuration or development. As discussed earlier, the event bus architecture described herein is especially advantageous in a service provider environment that hosts a variety of client applications. The event bus architecture allows these applications to be distributed across multiple regions and easily communicate with one another via application-specific events.

Figure 7A:
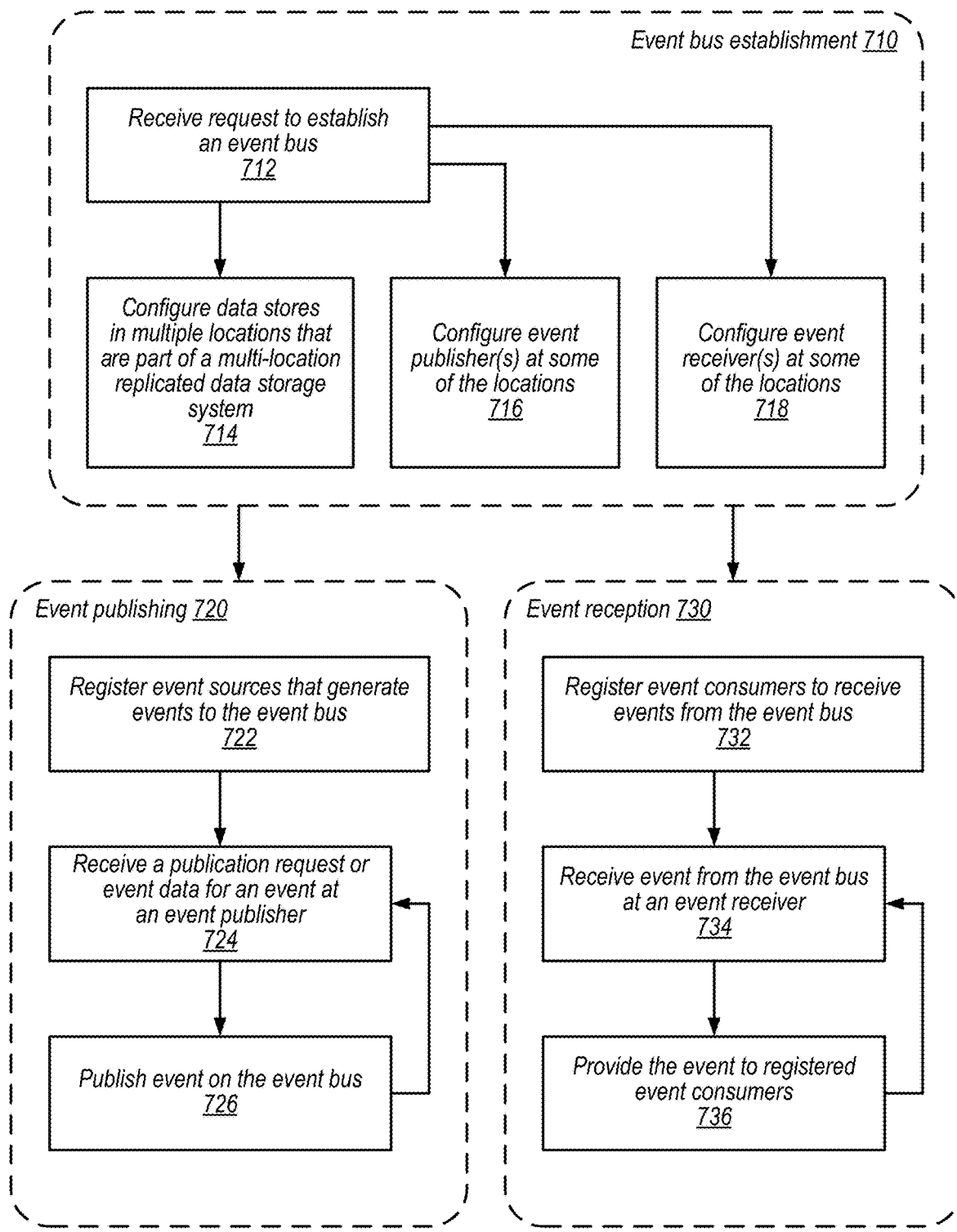
FIG. 7A is a flowchart illustrating a process of establishing an event bus in an event publishing system for heterogeneous events, according to some embodiments.

FIG. 7A is a flowchart illustrating a process of establishing an event bus in an event publishing system for heterogeneous events, according to some embodiments. As shown, the process is divided into three portions. First, an event bus is established in process 710.

Next, the event publishing process 720 and event reception process 730 may be performed on the event bus. In some embodiments, the depicted processes may be implemented by the event publishing system 100 of FIG. 1.

At operation 712, a request to establish an event bus is received. In some embodiments, the establishment process may be initiated via a configuration of the event publish system. In some embodiments, the event publishing system may be implemented as a service, that allows different users of clients to create different instances of the event bus. In some embodiments, the service (e.g. event bus service 240 of FIG. 2), may provide a configuration interface that allow users to define, initiate, modify, or terminate different event buses. In some embodiments, the request may specify a number of event bus locations that will be serviced by the event bus. In some embodiments, the one or more locations may be specified as a publishing location. In some embodiments, one or more locations may be specified as a receiving or destination location. In some embodiments, a location may be both a publishing and a receiving location. In some embodiments, other parameters may be specified for each location, such as for example buffer sizes, the enabling of encryption, location-specific time-to-live parameters, among other things.

At operation 714, data stores are configured in multiple locations that are part of a multi-location replicated data storage system. For example, the data stores may be data stores 120 and 160 of FIG. 1, and the multi-location replicated data storage system may be the multi-location replicated data storage system 150 of FIG. 1. In some embodiments, the data stores may be created for the sole purpose of the event bus. In some embodiments, existing data stores with other uses may be used for the event bus. In some embodiments, each event bus may be implemented using one or more data objects or tables within a single database instance. In some embodiments, certain supporting metadata (e.g. configuration metadata for the event publisher or event receiver) may also be initialized during this operation. In some embodiments, the event bus establishment process may end at operation 714, without configuring or initializing any event publishers or event receivers. In some embodiments, once the data stores are set up, the event publishing system may be advertised via an interface to be an operational event bus instance, and event publishers and event consumers may freely register to the advertised event bus as needed.

At operation 716, one or more event publishers may be configured at some of the event bus locations. The publishers may be for example event publisher 110 of FIG. 1. In some embodiments, the event publishers may be instantiated to place events on the event bus. In some embodiments, the event publishers may have a publisher interface, which may be used to receive event publishing requests. In some embodiments, the event publishers may be implemented as listeners that listen for or observe different data conditions and generate the events. For example, in some embodiments, the publisher may be configured to watch a log or certain metrics, and when a certain condition is detected (e.g. a log condition), generate an event on the event bus. In some embodiments, the event publishers may be implemented as event handlers in an event-driven execution service or environment, where the publishers are provisioned and invoked in response to detected new events. In some embodiments, the establishment of the event bus 710 may not involve the configuration or initiation of an event publisher. In some embodiments, event publisher(s) may be added or removed for the event bus at a later time, after the event bus has been established.

At operation 718, one or more event receivers are configured at some of the event bus locations. The event receivers may be for example event receiver 170 of FIG. 1. In some embodiments, the event receivers may be instantiated to retrieve events from the event bus. In some embodiments, the event receivers may have a consumer interface, which may be used to provide event to event consumers at that location. In some embodiments, the event consumer interface may be a push interface that pushes events to registered consumers. In some embodiments, the event receivers may be implemented as listeners that listen for events on the event bus. In some embodiments, the event receivers may be implemented as event handlers in an event-driven execution service or environment, where the receivers are provisioned and invoked in response to detected events on the event bus (e.g., in response to data changes on the change stream produced by the event bus). In some embodiments, the establishment of the event bus 710 may not involve the configuration or initiation of an event receiver. In some embodiments, event receiver(s) may be added or removed for the event bus at a later time, after the event bus has been established.

Once the event bus is established, different event publishers and event consumers may begin to use the event bus. At operation 722, one or more event sources may be registered to generate events to the event bus. In some embodiments, the event sources may register with the event bus. In some embodiments, the event bus may register as a listener to the event sources. In some embodiments, the event publishing system may provide a client interface or API that allows different applications to be registered to generate events to the event bus. In some embodiments, event sources may be added or removed for the event bus at any time that the event bus is operating in the event publishing system. As discussed, the event bus may be implemented to handle heterogeneous events from a variety of event sources, and implemented to automatically scale to handle the amount of generated event traffic.

At operation 724, a publication request or event data for an event is received at an event publisher. In some embodiments, the event publisher may provide a publishing interface that allows clients to submit event publishing requests to the event bus. In some embodiments, the event publisher may register to listen to events, or generate an event based on certain monitored conditions. At operation 726, the event is published on the event bus. Operation 726 may be performed by the event publisher, as discussed previously. As shown, the process may continue to receive new events and publish the received events on the event bus, until the event bus is terminated.

At operation 732, one or more event consumers may be registered to receive events from the event bus. In some embodiments, the consumers may register with the event bus (e.g. the event receiver) to receive push notifications or the events themselves via a push mechanism. In some embodiments, the event consumers may simply poll or actively pull the events from the event bus. In some embodiments, the event publishing system may provide a client interface or API that allows different applications to register to receive events from the event bus. In some embodiments, event consumers may be added or removed for the event bus at any time that the event bus is operating in the event publishing system. As discussed, the event bus may be implemented to handle heterogeneous events from a variety of event consumers, and implemented to automatically scale to handle a large number of event consumers.

At operation 734, an event is received from the event bus at an event receiver. In some embodiments, the event receiver may provide an event retrieval or push interface that allows clients to obtain or receive events from the event bus. In some embodiments, the event receiver may allow consumers to register to receive all events or some set of filtered events from the event bus. In some embodiments, each consumer client may specify different filtering criteria, so that they only receive events that meet their criteria. At operation 736, the event is provided to the event consumers. Operation 736 may be performed by the event receiver, as discussed previously. As shown, the process may continue to receive events from the event bus and provide the received events to registered consumers, until the event bus is terminated.

Figure 7B:
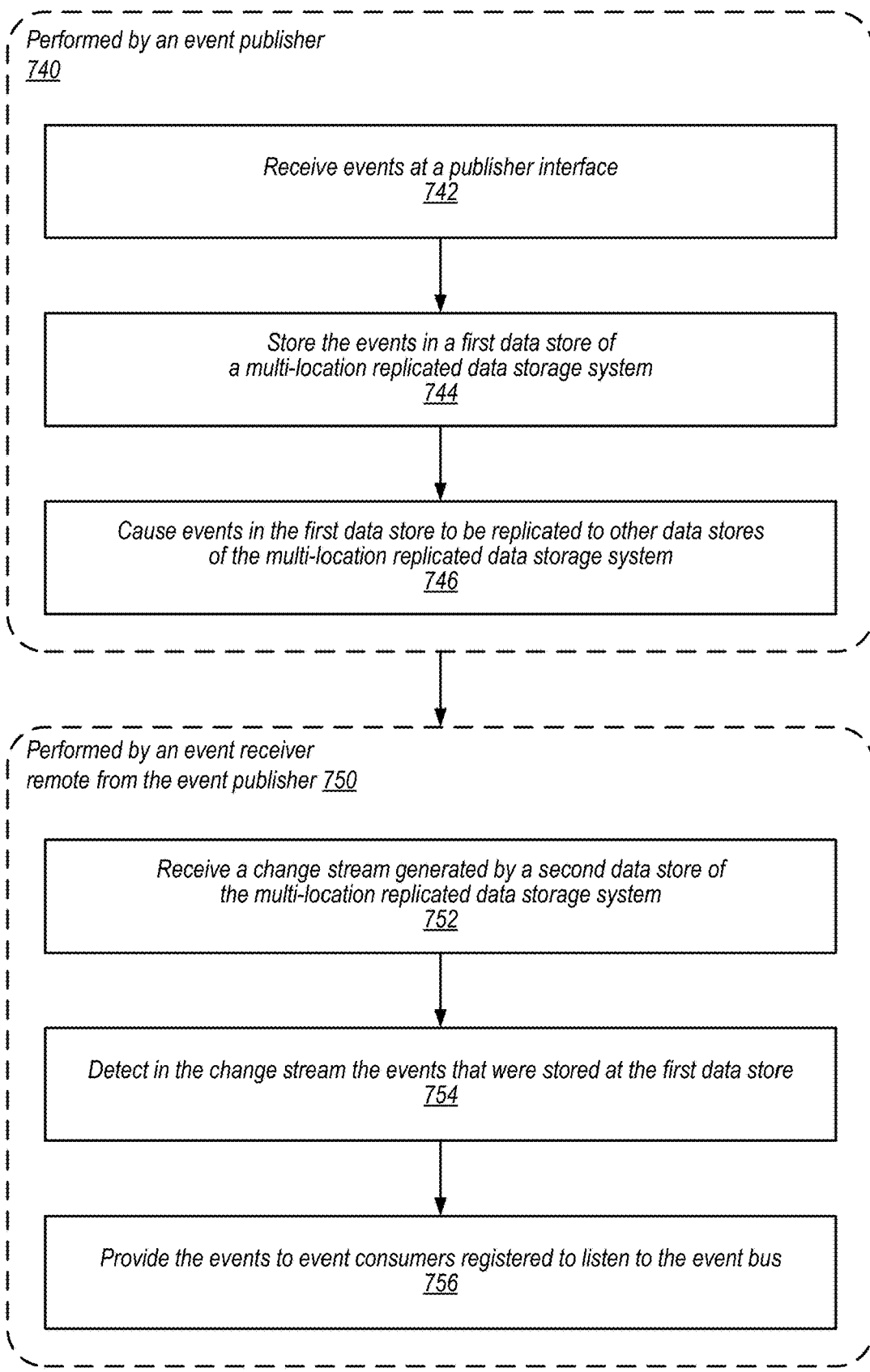
FIG. 7B is a flowchart illustrating a process of publishing and receiving an event in an event publishing system for heterogeneous events, according to some embodiments.

FIG. 7B is a flowchart illustrating a process of publishing and receiving an event in an event publishing system for heterogeneous events, according to some embodiments. As shown, the first part of the depicted process 740 may be performed by an event publisher, which may be the event publisher 110 of FIG. 1. As shown, the second part of the depicted process 750 may be performed by a remote event receiver, which may be the event receiver 170 of FIG. 1.

At operation 742, events are received at a publisher interface. The publisher interface may be part of the event publisher, such as the interface 115 of FIG. 1. In some embodiments, the event publisher interface may be an API, such a web service interface. In some embodiments, the event publisher interface may be a RESTful interface. In some embodiments, the event publisher interface may accept events with arbitrary event metadata. In some embodiments, the only event data may be received by the event publisher, and the event publisher may generate the actual event to be published on the event bus.

At operation 744, the events are stored in a first data store of a multi-location replicated data storage system. The multi-location replicated data storage system may be for example the data storage system 150 of FIG. 1. In some embodiments, the first data store may be a data store at the same location as the event publisher. In some embodiments, the data store may implement an event table that stores the events along with their metadata. In some embodiments, the event table may be in a replicated table group as a remote event table.

In some embodiments, some of event metadata may be generated by the event publisher. In some embodiments, the event publisher may generate an event ID for the event. In some embodiments, the event publisher may generate a sequence number that orders the events in the order they are received. In some embodiments, the event publisher may tag the events with a source location ID associated with the publisher's location. In some embodiments, the event publisher may associate the event with an event timestamp, which indicates the time that the event is received at the publisher. In some embodiments, certain event metadata may be provided by the client via the publisher interface. For example, the client may specify one or more destination location IDs for an event, and various application-specific metadata, which may be presented and stored as a map of key-value pairs. In some embodiments, all of this data may be stored in the event table or the data store.

At operation 746, the event publisher causes events in the first data store be replicated to other data stores of the multi-location replicated data storage system. In some embodiments, the first data store may be implemented using a database system that generates the change streams. In some embodiments, the database may generate an update stream for all changes to a table (e.g. inserts, updates, deletes), and store these changes in a stream repository that can be accessed as a stream. In some embodiments, by adding a new event record into the event table the event record may be added to the change stream. And that new event will be replicated to the other data stores via the change stream.

At operation 752, at a remote location, a change stream generated by a second data store of the multi-location replicated data storage system is received. In some embodiments, the second change stream may be an update stream generated from the second data store, in similar manner that the first change stream is generated from the first data store. In some embodiments, the event receiver may be registered to receive the second change stream, or periodically poll to download the second change stream.

At operation 754, events in the change stream are detected by the event receiver. The events may be events that were published on the event bus at remote locations, such as for example at operations 744 and 746. In some embodiments, the event receiver may register as a listener of the change stream in order to receive the events. In some embodiments, the event receiver may filter the change stream to obtain the events. In some embodiments, the change stream may be filtered based on the metadata attributes of the events in the first change stream. In some embodiments, the event receiver at the remote location may perform the filtering before or after event data is stored in the event table. In some embodiments, the filtering may be governed by a configurable policy, which may specify filtering conditions to filter events at that location. For example, in some embodiments, the event's destination location metadata attribute may be examined, and if the location's location ID is not specified in the destination location metadata, that event may be filtered out. Depending on the embodiment, a particular event bus location may filter based on, among other things, the event timestamp, the event size, the event type, the event's source location, etc.

At operation 756, the events from the change stream are provided to one or more event consumers registered to listen to the event bus. In some embodiments, the events may be provided via a consumer interface such as the event consumer interface 175 of FIG. 1. In some embodiments, the consumer interface may be an API, a web services interface, or a RESTful interface. In some embodiments, the consumer interface may be a push interface that pushes events to the consumers. In some embodiments, the consumer interface may be an interface that provides event records upon request. In some embodiments, the event consumers may subscribe to the event receiver to receive the change stream via the consumer interface. The event consumers may be any type of client application. In some embodiments, the event consumers may be implemented as event handlers in an event driven execution service.

Figure 8:
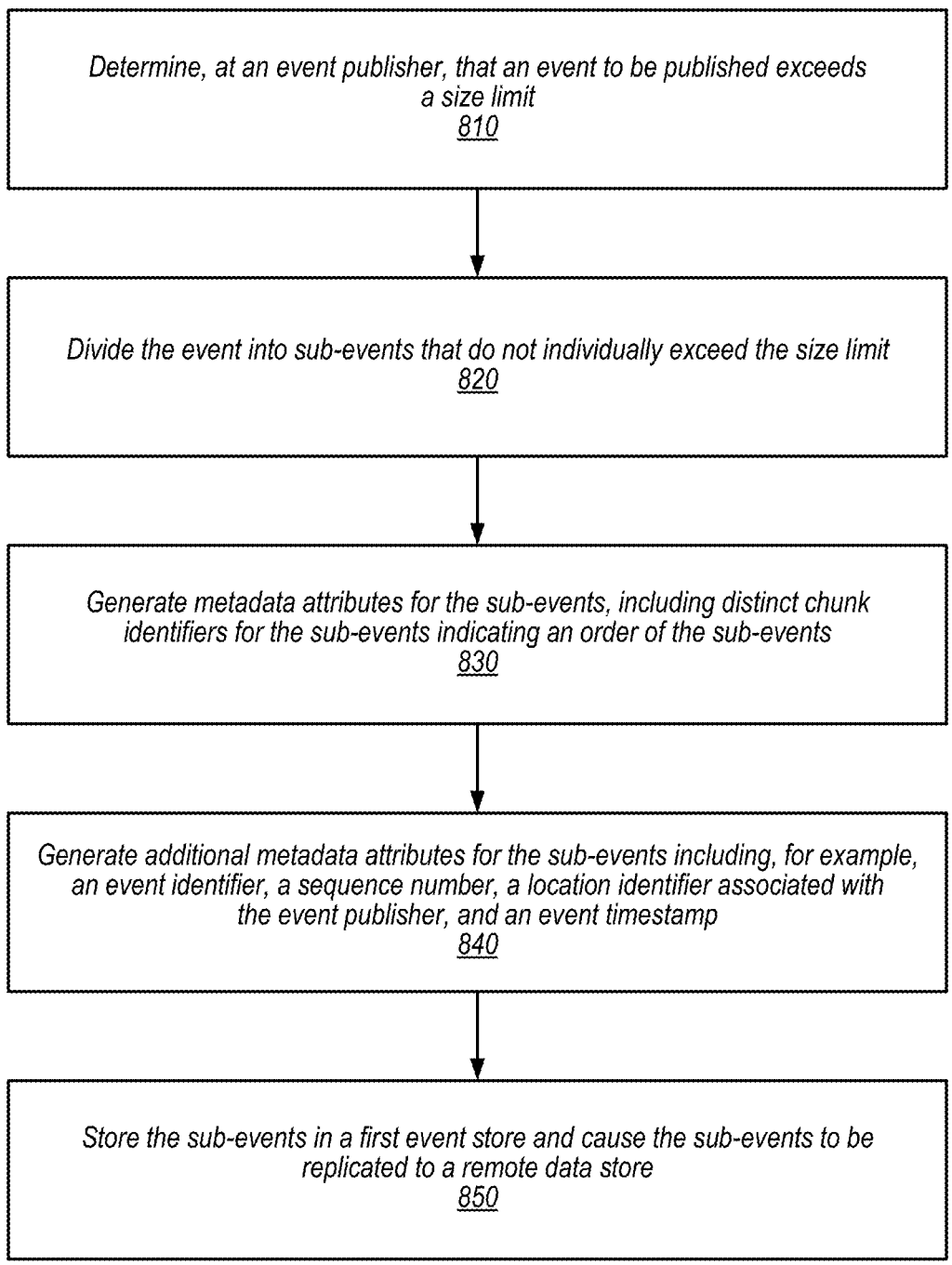
FIG. 8 is a flowchart illustrating a process of dividing an event into sub-events at an event publisher, according to some embodiments.

FIG. 8 is a flowchart illustrating a process of dividing an event into sub-events at an event publisher, according to some embodiments. In some embodiments, the process of FIG. 8 may be performed by, for example, event publisher 110 of FIG. 1.

At operation 810, a determination is made, at an event publisher, that an event to be publish exceeds a size limit. In some embodiments, the event publishing system may impose a size a limit on events, to prevent very large events from slowing down network traffic over the event bus. In some embodiments, the event publisher clients themselves may specify in their publish request that an event should be broken up in to event chunks of certain sizes.

At operation 820, the event is divided into sub-events (or event chunks) that do not individually exceed the size limit. In some embodiments, the received events may have a payload that can be divided into a number of chunks that are all below the size limit. The division may be performed so that the chunks can be programmatically reassembled to reproduce the original event.

At operation 830, metadata attributes are generated for the sub-events, including distinct chunk numbers or identifiers for the sub-events indicating an order of the sub-events. For example, if the original event is divided into four sub-events or chunks, each sub-event or chunk may be assigned a different number or identifier (e.g. 1, 2, 3, 4). In some embodiments, the numbering of the chunks allows the receiver of these chunks to easily reassemble the chunks into the original event. In some embodiments, the event publishing system may not guarantee that events placed on the bus will necessarily be delivered at a remote location in order. Thus, such numbering may be needed in some embodiments to recompose the original event from the chunks.

At operation 840, additional metadata attributes are generated for the sub-events, including for example an event identifier, a sequence number, an origin location identifier associated with the event publisher, and an event timestamp. As discussed, in some embodiments, such metadata are used within the event publishing system to track, filter, and manage events. For example, a change stream may be filtered at a remote location based on some of its metadata attributes. Operation 840 may be performed in similar fashion as discussed for operation 730 in FIG. 7, in some embodiments.

At operation 850, the sub-events are stored in a first data store. In some embodiments, the storing of the sub-events may cause the sub-events to be replicated to a remote data store. In some embodiments, this process may occur in similar fashion as discussed in connection with operation 746 of FIG. 7. As discussed, in some embodiments, the data store may generate an update stream that includes the sub-events. In some embodiments, the data store and the remote data store may both implement replicated event tables that are part of a same table replication group. By dividing the original event into sub-events, the event publishing system may send the sub-events individually, at different times, or even out of order. In some embodiments, the smaller sub-events allow the event publishing system to better manage the network traffic within the event publishing system.

Figure 9:
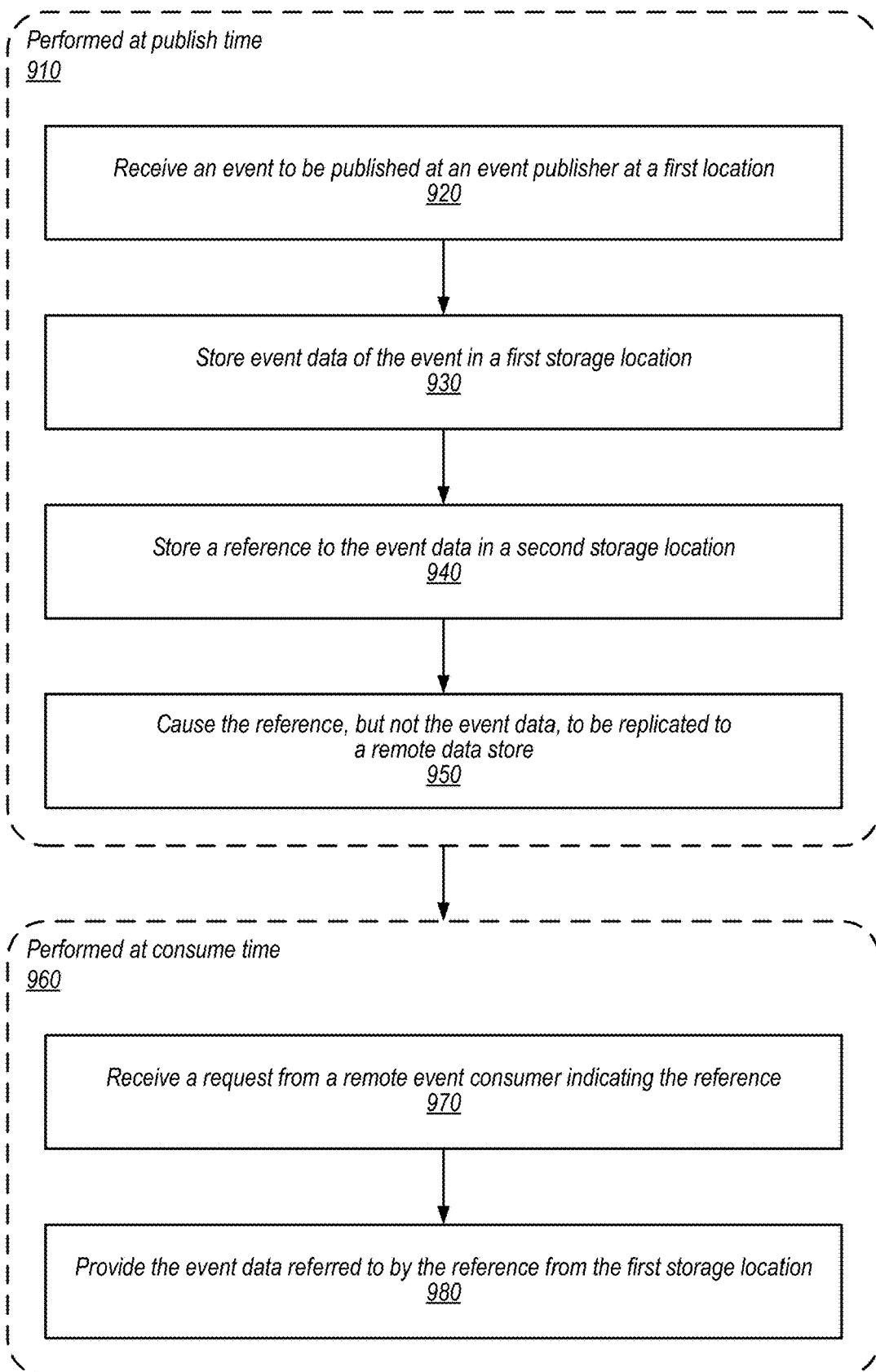
FIG. 9 is a flowchart illustrating a process of providing and using an event data reference in an event publishing system for heterogeneous events, according to some embodiments.

FIG. 9 is a flowchart illustrating a process of providing and using an event data reference in an event publishing system for heterogeneous events, according to some embodiments. As shown, the top portion 910 of the depicted process may be performed at event publish timer. In some embodiments, the top portion 910 may be performed by an event publisher such as event publisher 110 of FIG. 1. As shown, the bottom portion 960 of the process may be performed when an event is consumed. In some embodiments, portion 960 may be performed by the event publisher 110 or some other component located at the same location as the event publisher.

At operation 920, an event to be published is received at an event publisher (e.g. publisher 110) at a first location. In some embodiments, the event may be received via an event publishing interface, such as the publisher interface 115 of FIG. 1. In some embodiments, operation 920 may be performed in similar fashion as discussed for operation 720 of FIG. 7.

In some embodiments, certain events may include event data that will not be initially broadcast on the event bus. For example, in some embodiments, a portion of the event data may be too large, exceeding a size threshold for the event bus. In some embodiments, some portion of the event's data may be deemed to be too sensitive to be broadcast over the event bus. Accordingly, some portion of the event data may be kept off of the event bus, and stored for later retrieval. In some embodiments, the decision as to what event data is or is not broadcast over the event bus may be dictated by one or more metadata parameters specified by the publishing client. In some embodiments, the decision may be made by the event publisher, which may make such decisions according to a configurable policy. For example, the event publisher may hold back certain event data from events that meet a certain criterion (e.g. events exceeding a certain size, events exceeding a certain TTL threshold, events generated during certain high traffic times, etc.) Depending on the embodiment, different configurable parameters of the event publishing system may be defined at the service level, on a per-location basis, a per-bus basis, a per-event or event-type basis, etc. In some embodiments, default parameter values of the system may be defined for a broad context, and be overridden by another parameter value defined for a narrower setting. For example, the event publish system may define a default maximum size for events to be broadcast on the event buses in general, and a particular event bus may override the maximum size by specifying a different size threshold.

At operation 930, some event data of the event is stored at a first storage location (e.g. a first table in the data store 120 or some other data repository). In some embodiments, the storing of the event data at the first storage location does not cause the event data to be replicated to other data stores. In some embodiments, the event data of the event may represent a data object or information that should not be placed on the event bus. In some embodiments, the event data may be too large to be placed on the event bus. In some embodiments, the event data may represent sensitive subject matter, and the publishing client may specify in the publish request to not transmit this data over the event bus. In some embodiments, the first storage location may be a table (e.g.

additional event data table 530) or other storage location that will hold the event data for later retrieval.

At operation 940, a reference to the event data is stored in a second storage location. In some embodiments, the second storage location may be the event table (e.g. event table 252) that is replicated to a remote data store. In some embodiments, the reference to the event data may be event data reference 520, as discussed in connection with FIG. 5.

At operation 950, event publishing system causes the reference, but not the event data, to be replicated to a remote data store. In some embodiments, the remote data store may be data store 160 of FIG. 1. As discussed, in some embodiment, by storing event records in the event table, the data store causes the event records to be added to a change stream, which is used to replicate the contents of the event table to the remote data store. However, data in the second storage location (e.g. additional event data table 530) may not be added to the change stream. Thus, the data in the second storage location are not immediately published onto the event bus.

At operation 970, a request is received from a remote event consumer indicating the reference. In some embodiments, a remote consumer may receive the event containing the reference for consumption. When the remote consumer discovers the data reference, the remote consumer may contact the data store at the source location to retrieve the data pointed to by the reference, i.e., the event data that was stored at the first storage location. In some embodiments, the request may be sent via a remote event receive, such as the event receiver 170 of FIG. 5.

At operation 980, the data store at the origin location may provide the event data referred to by the reference. In some embodiments, the reference may indicate an identifier or key that uniquely identifies the event data. In some embodiments, the requesting consumer may first need to be authenticated before it is granted access to the event data. As may be understood, by storing the event data in a first location, the event data is not immediately placed on the event bus. Rather, the event data is stored for a time period, and provided upon later request. In this manner, the excessively large event data does not bog down the network traffic on the event bus. Moreover, sensitive event data are not broadcast to all recipients in the event bus network.

Figure 10:
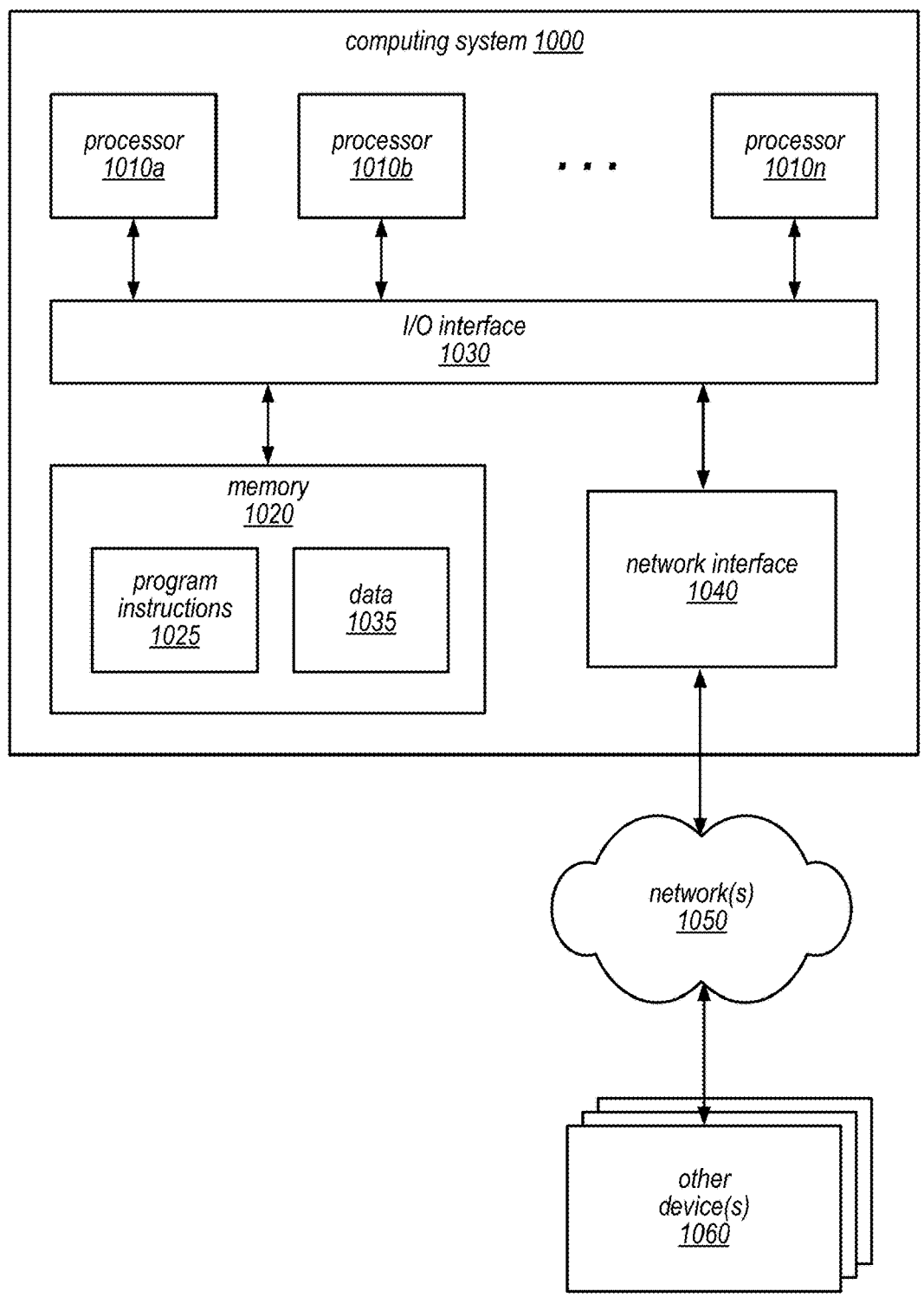
FIG. 10 is a block diagram illustrating an example computer system that can be used to implement one or more portions of an event publishing system that distributes heterogeneous events across different locations of a distributed system, according to some embodiments.

FIG. 10 is a block diagram illustrating an example computer system that can be used to implement one or more portions of an event publishing system that distributes heterogeneous events across different locations of a distributed system, according to some embodiments. Computer system 1000 may include or be configured to access one or more nonvolatile computer-accessible media. In the illustrated embodiment, computer system 1000 includes one or more processors 1010 coupled to a system memory 1020 via an input/output (I/O) interface 1030. Computer system 1000 further includes a network interface 1040 coupled to I/O interface 1030.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store instructions and data accessible by processor(s) 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1020 as code 1025 and data 1035.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 920, may be incorporated directly into processor 1010.

Network interface 1040 may be configured to allow data to be exchanged between computer system 1000 and other devices 1060 attached to a network or networks 1050, such as other computer systems or devices, such as routers and other computing devices, as illustrated in FIGS. 1 through 9, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may be one embodiment of a computer-accessible medium configured to store program instructions and data as described above for FIGS. 1 through 9 for implementing embodiments of methods and apparatus for traffic analysis. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

The invention claimed is:

1. A system, comprising:
one or more hardware processors with associated memory that implement an event publishing system, configured to:
receive a request to establish an event bus over a plurality of locations;
establish the event bus responsive to the request, wherein the event bus includes:
a plurality of data stores at respective ones of the plurality of locations, wherein the data stores are part of a multi-location replicated data storage system configured to replicate a first data object in a first one of the data stores at a source location of the locations to other ones of the data stores at other ones of the locations,
an event publisher at the source location to publish events on the event bus, and
respective event receivers at the other locations to receive events from the event bus;
one or more hardware processors with associated memory that implement the event publisher, configured to:
receive event data corresponding to an event to be published on the event bus;
responsive to receipt of the event data, store the event in the first data object of the first data store, wherein the storing causes the event to be replicated to other ones of the data stores; and
one or more hardware processors with associated memory that implement one of the event receivers, configured to:
receive, at another location of the locations distinct from the source location, a change stream of a second data object in a second data store of the data stores;
detect in the change stream the event that was stored at the source location; and
provide the event to one or more event consumers at the other location registered to listen to the event bus via an event consumer interface of the event receiver.

2. The system of claim 1, wherein the event publishing system is implemented as part of an event publishing service hosted in a service provider network, and the multi-location replicated data storage system is implemented as part of a database service hosted in the service provider network.

3. The system of claim 2, wherein the event receiver comprises an event handler that is invoked in an event-driven execution service hosted in the service provider network, in response to a data change in the change stream.

4. The system of claim 1, wherein:
to store the event in the first data object, the event publisher is configured to generate one or more metadata attributes for the event including an event identifier, a location identifier for the source location, and an event timestamp; and
to detect the event in the change stream, the event receiver is configured to filter events in the change stream based at least in part on their respective metadata attributes.

5. The system of claim 1, wherein the event publishing system is configured to:
store a time-to-live value with the event; and
responsive to a determination that the event has expired based on its time-to-live value, delete the event from the first data object.

6. A method, comprising:
performing, by one or more hardware processors with associated memory implementing an event publishing system:
receiving a request to establish an event bus over a plurality of locations;
establishing the event bus responsive to the request, wherein the event bus includes:
a plurality of data stores at respective ones of the plurality of locations, wherein the data stores are part of a multi-location replicated data storage system configured to replicate a first data object in a first one of the data stores at a source location of the locations to other ones of the data stores at other ones of the locations,
an event publisher at the source location to publish events on the event bus, and
respective event receivers at the other locations to receive events from the event bus;
performing, by the event publisher at the source location:
receiving event data corresponding to an event to be published on the event bus;
responsive to receiving the event data, storing the event in the first data object of the first data store, wherein the storing causes the event to be replicated to other ones of the data stores; and performing, by at least one of the event receivers at another location of the locations distinct from the source location:
receiving a change stream of a second data object in a second data store of the data stores;
detecting in the change stream the event that was stored at the source location; and
providing the event to one or more event consumers at the other location registered to listen to the event bus via an event consumer interface of the event receiver.

7. The method of claim 6, wherein the event publishing system is implemented as part of an event publishing service hosted in a service provider network, and the multi-location replicated data storage system is implemented as part of a database service hosted in the service provider network.

8. The method of claim 7, wherein the receiving of the detecting and providing of the event are performed by an event handler that is invoked in an event-driven execution service hosted in the service provider network, in response to a data change in the change stream.

9. The method of claim 6, wherein detecting the event in the change stream comprises filtering events in the change stream based at least in part on respective destination locations specified for at least some of the events in the change stream.

10. The method of claim 6, wherein:
storing the event in the first data object comprises storing one or more metadata attributes generated for the event including an event identifier, a location identifier for the source location, and an event timestamp; and
detecting the event in the change stream comprises filtering events in the change stream based at least in part on their respective metadata attributes.

11. The method of claim 10, wherein generating the metadata attributes for the event comprises:
generating an attribute map for the event, wherein the attribute map contains one or more attribute tags and one or more corresponding attribute values for the event, and wherein respective attribute maps of at least some events contain different attribute tags.

12. The method of claim 10, wherein:
the event data is received via a publish request;
the publish request specifies one or more filter criteria for the event; and
the filtering of the events in the change stream is performed based at least in part on respective filtering criteria for at least some of the events in the change stream.

13. The method of claim 6, further comprising performing, by the event publisher:
determining that a particular event to be published exceeds a size limit;
dividing the particular event into sub-events that do not individually exceed the size limit;
including respective identifiers in respective ones of the sub-events, the identifiers indicating an ordering of the sub-events; and
storing the sub-events as individual records in the first data object.

14. The method of claim 6, further comprising:
receiving a particular event to be published;
storing event data of the particular event in a first storage location, wherein the storing of the event data in the first storage location does not cause the event data to be replicated to the other data stores;
storing a reference to the event data in a second storage location, wherein the storing of the reference in the second storage location causes the reference to be replicated to the other data stores; and
responsive to a retrieval request from a remote consumer indicating the reference, providing the event data of the particular event from the first storage location.

15. The method of claim 6, wherein storing the event in the first data object comprises encrypting a payload of the event in the first data object using an encryption key generated by the event publisher.

16. The method of claim 6, further comprising:
determining, based at least in part on a time-to-live value associated with a stored event in the first data object, that the stored event has expired; and
responsive to the determination that the stored event has expired, deleting the stored event from the first data object.

17. The method of claim 6, further comprising performing, at the source location:
receiving a change stream of the first data object;
detecting the event in the change stream of the first data object; and
providing the event to one or more event consumers at the source location registered to listen to the event bus via an event consumer interface of an event receiver at the source location.

18. The method of claim 6, wherein providing events in the change stream to an event consumer comprises:
providing a page of the events in the change stream to the event consumer, along with a pagination token indicating a start of a next page of events in the change stream;
responsive to a request from the event consumer indicating the pagination token, providing the next page of events in the change stream to the event consumer.

19. One or more non-transitory computer-accessible storage media storing program instructions that when executed on or across one or more processors of an event publishing system, cause the event publisher to:
configure an event bus over a plurality of locations, wherein the event bus includes:
a plurality of data stores at respective ones of the plurality of locations, wherein the data stores are part of a multi-location replicated data storage system configured to replicate a first data object in a first one of the data stores at a source location of the locations to other ones of the data stores at other ones of the locations,
an event publisher at the source location to publish events on the event bus, and
respective event receivers at the other locations to receive events from the event bus;
configure the event publisher to:
receive event data corresponding to an event to be published on the event bus;
responsive to receipt of the event data, store the event in the first data object of the first data store, wherein the storing causes the event to be replicated to other ones of the data stores; and
configure at least one of the event receivers to:
receive, at another location of the locations distinct from the source location, a change stream of a second data object in a second data store of the data stores;
detect in the change stream the event that was stored at the source location; and
provide the event to one or more event consumers at the other location registered to listen to the event bus via an event consumer interface of the event receiver.

20. The one or more non-transitory computer-accessible storage media of claim 19, wherein to configure the event receiver, the program instructions when executed on or across the one or more processors cause the event publishing system to:
configure an event handler in an event-driven execution service to be invoked in response to a data change in the change stream.

* * * * *